(12) United States Patent
Ishizuka et al.

(10) Patent No.: US 12,504,091 B2
(45) Date of Patent: Dec. 23, 2025

(54) ELECTRIC VALVE CONTROL DEVICE AND ELECTRIC VALVE DEVICE

(71) Applicant: FUJIKOKI CORPORATION, Tokyo (JP)

(72) Inventors: Yusuke Ishizuka, Tokyo (JP); Bunta Narukawa, Tokyo (JP); Kai Ogiwara, Tokyo (JP)

(73) Assignee: FUJIKOKI CORPORATION, Tokyo (JP)

(*) Notice: Subject to any disclaimer, the term of this patent is extended or adjusted under 35 U.S.C. 154(b) by 15 days.

(21) Appl. No.: 18/832,839

(22) PCT Filed: Dec. 28, 2022

(86) PCT No.: PCT/JP2022/048468
§ 371 (c)(1),
(2) Date: Jul. 24, 2024

(87) PCT Pub. No.: WO2023/149146
PCT Pub. Date: Aug. 10, 2023

(65) Prior Publication Data
US 2025/0172218 A1 May 29, 2025

(30) Foreign Application Priority Data
Feb. 4, 2022 (JP) .................. 2022-016471

(51) Int. Cl.
*F16K 31/04* (2006.01)
*F16K 37/00* (2006.01)
*H02P 8/08* (2006.01)

(52) U.S. Cl.
CPC ........ *F16K 31/046* (2013.01); *F16K 37/0041* (2013.01); *H02P 8/08* (2013.01)

(58) Field of Classification Search
CPC ..... F16K 31/04; F16K 31/046; F16K 37/0041
See application file for complete search history.

(56) References Cited

U.S. PATENT DOCUMENTS 10,352,475 B2 * 7/2019 Uehara ............... F16K 37/0041
10,975,984 B2 * 4/2021 Uehara ................ F16K 31/53
(Continued)

FOREIGN PATENT DOCUMENTS

JP 2003-329698 A 11/2003
JP 4028291 B2 12/2007
(Continued)

OTHER PUBLICATIONS

ISA/JP, "PCT International Search Report" and "PCT Written Opinion of the International Searching Authority" for the corresponding PCT application No. PCT/JP2022/048468, mailed Mar. 28, 2023, with English translation, 15 pages.
(Continued)

*Primary Examiner* — Eric Keasel
(74) *Attorney, Agent, or Firm* — LUCAS & MERCANTI, LLP

(57) ABSTRACT

An electric valve control device is configured to (i) start inputting pulse to a stepping motor to rotate a rotor in a first direction, (ii) obtain a rotation angle of the rotor based on a rotation angle signal and a position of the rotor based on a magnetic-flux-density signal each time pulse is input to the stepping motor, and (iii) stop inputting pulse when a change in the rotation angle of the rotor matches a change pattern information and a position of the rotor is a proximity position or a position nearer a reference position than is the proximity position. The change pattern information includes a change in the rotation angle indicating rotation in a second direction.

9 Claims, 21 Drawing Sheets

(56) References Cited

U.S. PATENT DOCUMENTS

| | | | |
|---|---|---|---|
| 10,982,792 B2* | 4/2021 | Uehara | ............... F16K 37/0033 |
| 2019/0353271 A1 | 11/2019 | Uehara et al. | |

FOREIGN PATENT DOCUMENTS

| | | |
|---|---|---|
| JP | 2021-185326 A | 12/2021 |
| WO | 2019/130928 A1 | 7/2019 |

OTHER PUBLICATIONS

Japanese Patent Office, "Notice of Reasons for Refusal" for the corresponding Japanese Patent Application No. 2023-162857, mailed May 7, 2024, with English translation, 12 pages.
Office Action, mailed Sep. 1, 2025, which was issued for the corresponding Korean Patent Application No. 10-2024-7012775, 10 pages, with English translation.

* cited by examiner

| | P[1] | P[2] | P[3] | P[4] | P[5] | P[6] | P[7] | P[8] | NOTE |
|---|---|---|---|---|---|---|---|---|---|
| A-PHASE STATOR | + | + | O | − | − | − | O | + | +: A1→A2<br>0: OFF<br>−: A2→A1 |
| B-PHASE STATOR | O | + | + | + | O | − | − | − | +: B1→B2<br>0: OFF<br>−: B2→B1 |

FIG.9
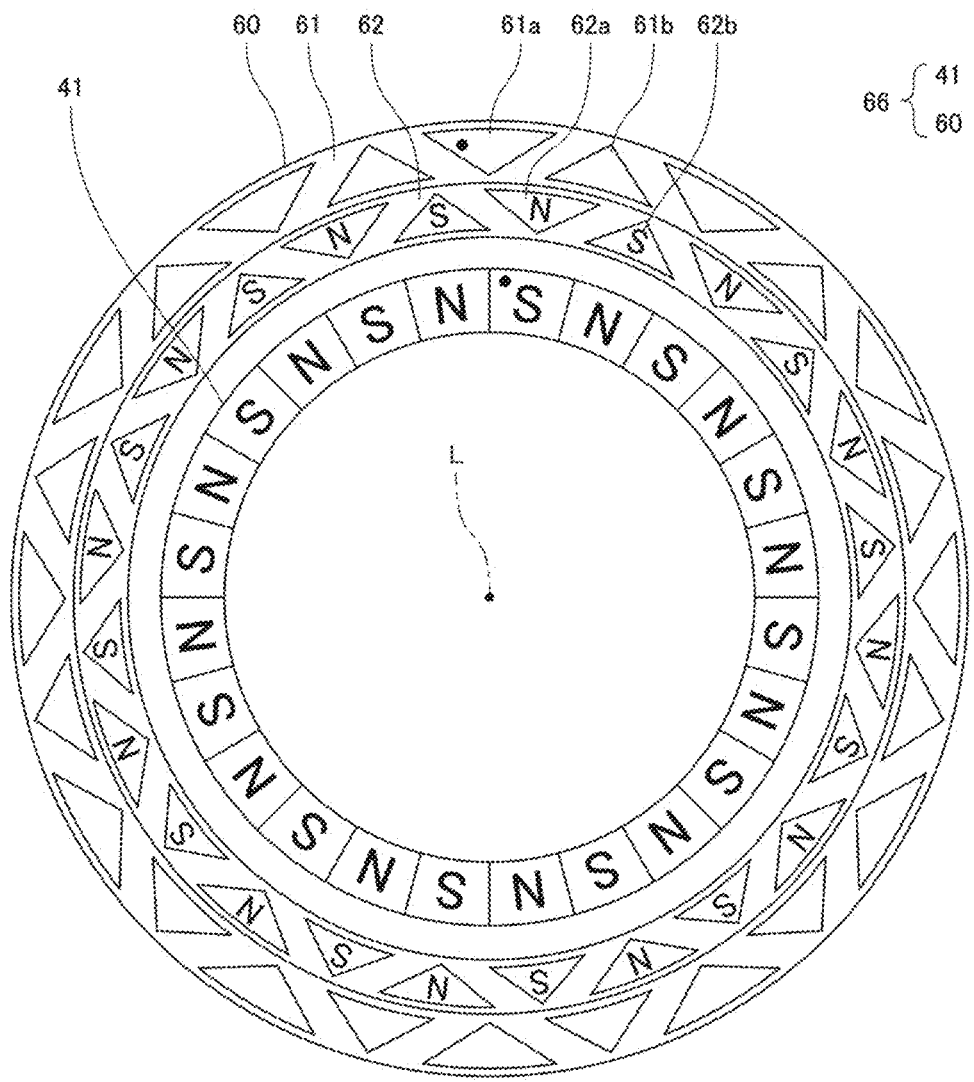
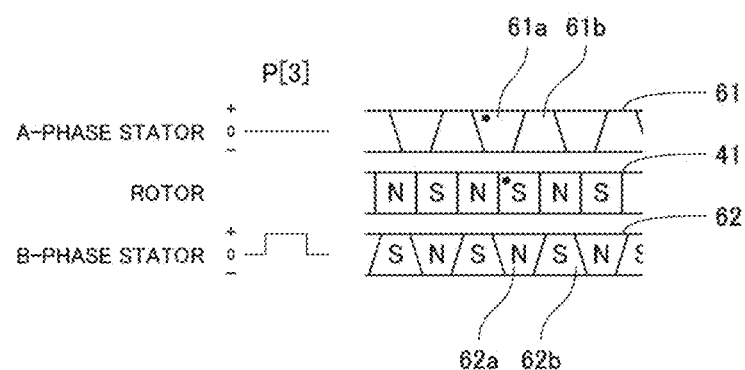

FIG.18

| PULSE P | P[7] | P[8] | P[1] | P[2] | P[3] | P[4] | P[5] | P[6] |
|---|---|---|---|---|---|---|---|---|
| CHANGE INFORMATION | 1 | 1 | 1 | 0 | 0 | 0 | 0 | 2 |

(A)

| PULSE P | P[7] | P[8] | P[1] | P[2] | P[3] | P[4] | P[5] | P[6] |
|---|---|---|---|---|---|---|---|---|
| CHANGE INFORMATION | 3.75 | 3.75 | 3.75 | 0 | 0 | 0 | 0 | -11.25 |

(B)

| ORDER | 1 | 2 | 3 | 4 | 5 | 6 | 7 | 8 |
|---|---|---|---|---|---|---|---|---|
| CHANGE INFORMATION | 1 | 1 | 1 | 0 | 0 | 0 | 0 | 2 |

(C)

ELECTRIC VALVE CONTROL DEVICE AND ELECTRIC VALVE DEVICE

CROSS REFERENCE TO RELATED APPLICATION

This Application is a 371 of PCT/JP2022/048468 filed on Dec. 28, 2022, which, in turn, claimed the priority of Japanese Patent Application No. 2022-016471 filed on Feb. 4, 2022, which is incorporated herein by reference.

TECHNICAL FIELD

The present invention relates to an electric valve control device and an electric valve device with the electric valve control device.

BACKGROUND ART

Patent Literature 1 discloses an example of an electric valve according to the related art. The electric valve is installed in a refrigeration cycle system of an air conditioner. The electric valve includes a valve body, a valve member, and a stepping motor for moving the valve member. The stepping motor includes a rotor and a stator. The rotor rotates in response to pulses input to the stepping motor. The electric valve includes a movement mechanism to move the valve member along with the rotation of the rotor. The rotor is rotated within a range from a reference position to a full-open position. When the rotor rotates toward the reference position (rotates in a first direction), the valve member moves toward a valve port. When the rotor is at the reference position, a movable stopper mounted on the rotor is in contact with a fixed stopper mounted on the valve body, restricting the rotation of the rotor in the first direction. When the rotor is at the full-open position, the valve member is positioned farthest from the valve port of the valve body.

The electric valve is controlled by an electric valve control device. In an initialization operation, the electric valve control device inputs pulses to the stepping motor to rotate the rotor in the first direction and positions the rotor at the reference position. The number of pulses input to the stepping motor is large enough to bring the movable stopper into contact with the fixed stopper. The number of pulses is referred to as an initialization number. The initialization number is set based on the number of pulses input to the stepping motor when the rotor is rotated from the full-open position to the reference position. When the rotor rotates in the first direction and the movable stopper comes into contact with the fixed stopper, the rotor is positioned at the reference position.

CITATION LIST

Patent Literature

Patent Literature 1: WO2019/130928

SUMMARY OF INVENTION

Technical Problem

The electric valve control device inputs pulses to the stepping motor until the number of pulses input to the stepping motor reaches the initialization number. Thus, the electric valve control device may further input pulses after the rotor is positioned at the reference position, resulting in a long duration of the initialization operation. Additionally, when pulses are input to the stepping motor after the rotor is positioned at the reference position, the movable stopper repeatedly collides with the fixed stopper, which causes noise. Especially when the rotor is near the reference position immediately before the initialization operation, the noise lasts a long time. Repetitive collision of the movable stopper with the fixed stopper may cause wear and tear on the movable stopper, the fixed stopper, and the movement mechanism.

Accordingly, it is an object of the present invention to provide an electric valve control device and an electric valve device that are capable of reducing a duration of an initialization operation for an electric valve and suppressing noise.

Solution to Problem

To achieve the object above, an electric valve control device according to an aspect of the present invention is an electric valve control device for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position.

The electric valve control device includes a rotation angle sensor that outputs a signal corresponding to a rotation angle of the rotor.
  (i) The electric valve control device is configured to start inputting a pulse to the stepping motor to rotate the rotor in the first direction.
  (ii) The electric valve control device is configured to obtain the rotation angle of the rotor based on the signal of the rotation angle sensor each time the pulse is input to the stepping motor.
  (iii) The electric valve control device is configured to stop inputting the pulse to the stepping motor when a change in the rotation angle matches a change pattern that is predetermined.

The change pattern includes a change in the rotation angle indicating rotation in the second direction.

To achieve the above object, an electric valve control device according to another aspect of the present invention is an electric valve control device for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position.

The electric valve control device includes a rotation angle sensor that outputs a signal corresponding to a rotation angle of the rotor and a position sensor that outputs a signal corresponding to a position of the rotor.
  (i) The electric valve control device is configured to start inputting a pulse to the stepping motor to rotate the rotor in the first direction.
  (ii) The electric valve control device is configured to obtain the rotation angle of the rotor based on the signal of the rotation angle sensor and the position of the rotor based on the signal of the position sensor each time the pulse is input to the stepping motor.

(iii) The electric valve control device is configured to stop inputting the pulse to the stepping motor when a change in the rotation angle matches a change pattern that is predetermined and the position of the rotor is a proximity position that is predetermined or a position nearer the reference position than is the proximity position.

The change pattern includes a change in the rotation angle indicating rotation in the second direction.

In the present invention, preferably, the change pattern further includes a change in the rotation angle indicating the rotation in the first direction.

In the present invention, preferably, the change pattern includes changes in the rotation angle corresponding to multiple pulses repeatedly input to the stepping motor in a predetermined order.

In the present invention, preferably, the electric valve control device is configured to obtain, in an operation to set the change pattern, rotation angles corresponding to the multiple pulses and set the change pattern based on the rotation angles when the change in the rotation angle indicating the rotation in the second direction is detected while the pulse is input to the stepping motor to rotate the rotor in the first direction.

To achieve the above object, an electric valve control device according to still another aspect of the present invention is an electric valve control device for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position.

The electric valve control device includes a rotation angle sensor that outputs a signal corresponding to a rotation angle of the rotor.
  (i) The electric valve control device is configured to start inputting a pulse to the stepping motor to rotate the rotor in the first direction.
  (ii) The electric valve control device is configured to obtain the rotation angle of the rotor based on the signal of the rotation angle sensor each time the pulse is input to the stepping motor.
  (iii-1) The electric valve control device is configured to stop inputting the pulse to the stepping motor when a change in the rotation angle indicating rotation in the second direction is detected, or (iii-2) the electric valve control device is configured to stop inputting the pulse to the stepping motor when a change in the rotation angle indicating the rotation in the first direction is detected after the change in the rotation angle indicating the rotation in the second direction is detected.

To achieve the above object, an electric valve control device according to still another aspect of the present invention is an electric valve control device for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position.

The electric valve control device includes a rotation angle sensor that outputs a signal corresponding to a rotation angle of the rotor and a position sensor that outputs a signal corresponding to a position of the rotor.
  (i) The electric valve control device is configured to start inputting a pulse to the stepping motor to rotate the rotor in the first direction.
  (ii) The electric valve control device is configured to obtain the rotation angle of the rotor based on the signal of the rotation angle sensor and the position of the rotor based on the signal of the position sensor each time the pulse is input to the stepping motor.
  (iii-1) The electric valve control device is configured to stop inputting the pulse to the stepping motor when a change in the rotation angle indicating rotation in the second direction is detected and the position of the rotor is a proximity position that is predetermined or a position nearer the reference position than is the proximity position, or (iii-2) the electric valve control device is configured to stop inputting the pulse to the stepping motor when a change in the rotation angle indicating the rotation in the first direction is detected after the change in the rotation angle indicating the rotation in the second direction is detected and the position of the rotor is the proximity position or the position nearer the reference position than is the proximity position.

In the present invention, preferably, the electric valve includes a permanent magnet mounted on the rotor, and the rotation angle sensor outputs a signal corresponding to a rotation angle of a magnetic field generated by the permanent magnet.

In the present invention, preferably, the electric valve includes a permanent magnet mounted on the rotor. Preferably, the rotor moves toward the valve port when the rotor rotates in the first direction and moves away from the valve port when the rotor rotates in the second direction. Preferably, the rotation angle sensor outputs a signal corresponding to a rotation angle of a magnetic field generated by the permanent magnet. Preferably, the position sensor outputs a signal corresponding to a strength of the magnetic field generated by the permanent magnet.

To achieve the above object, an electric valve control device according to still another aspect of the present invention is an electric valve control device for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position.

The electric valve control device includes a rotation angle sensor that outputs a signal, which is a rotation angle signal, corresponding to a rotation angle of the rotor.
  (i) The electric valve control device is configured to start inputting a pulse to the stepping motor to rotate the rotor in the first direction.
  (ii) The electric valve control device is configured to obtain the rotation angle signal.
  (iii) The electric valve control device is configured to stop inputting the pulse to the stepping motor when a change in the rotation angle signal matches a change pattern that is predetermined.

The change pattern includes a change in the rotation angle signal indicating rotation in the second direction.

To achieve the above object, an electric valve control device according to still another aspect of the present invention is an electric valve control device for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position.

The electric valve control device includes a rotation angle sensor that outputs a signal, which is a rotation angle signal, corresponding to a rotation angle of the rotor and a position sensor that outputs a signal, which is a position signal, corresponding to a position of the rotor.

(i) The electric valve control device is configured to start inputting a pulse to the stepping motor to rotate the rotor in the first direction.

(ii) The electric valve control device is configured to obtain the rotation angle signal and the position signal.

(iii) The electric valve control device is configured to stop inputting the pulse to the stepping motor when a change in the rotation angle signal matches a change pattern that is predetermined and the position signal has a value corresponding to a proximity position that is predetermined or a position nearer the reference position than is the proximity position.

The change pattern includes a change in the rotation angle signal indicating rotation in the second direction.

To achieve the above object, an electric valve control device according to still another aspect of the present invention is an electric valve control device for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position.

The electric valve control device comprising a rotation angle sensor that outputs a signal, which is a rotation angle signal, corresponding to a rotation angle of the rotor.

(i) The electric valve control device is configured to start inputting a pulse to the stepping motor to rotate the rotor in the first direction.

(ii) The electric valve control device is configured to obtain the rotation angle signal.

(iii-1) The electric valve control device is configured to stop inputting the pulse to the stepping motor when a change in the rotation angle signal indicating rotation in the second direction is detected, or (iii-2) the electric valve control device is configured to stop inputting the pulse to the stepping motor when a change in the rotation angle signal indicating the rotation in the first direction is detected after the change in the rotation angle signal indicating the rotation in the second direction is detected.

To achieve the above object, an electric valve control device according to still another aspect of the present invention is an electric valve control device for controlling an electric valve.

The electric valve includes a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position.

The electric valve control device includes a rotation angle sensor that outputs a signal, which is a rotation angle signal, corresponding to a rotation angle of the rotor and a position sensor that outputs a signal, which is a position signal, corresponding to a position of the rotor.

(i) The electric valve control device is configured to start inputting a pulse to the stepping motor to rotate the rotor in the first direction.

(ii) The electric valve control device is configured to obtain the rotation angle signal and the position signal.

(iii-1) The electric valve control device is configured to stop inputting the pulse to the stepping motor when a change in the rotation angle signal indicating rotation in the second direction is detected and the position signal has a value corresponding to a proximity position that is predetermined or a position nearer the reference position than is the proximity position, or (iii-2) the electric valve control device is configured to stop inputting the pulse to the stepping motor when a change in the rotation angle signal indicating the rotation in the first direction is detected after the change in the rotation angle signal indicating the rotation in the second direction is detected and the position signal has the value corresponding to the proximity position or the position nearer the reference position than is the proximity position.

To achieve the above object, an electric valve device according to still another aspect of the present invention is an electric valve device that includes the electric valve and the electric valve control device.

Advantageous Effects of Invention

According to the present invention,
(i) the electric valve control device is configured to start inputting the pulse to the stepping motor to rotate the rotor in the first direction,
(ii) the electric valve control device is configured to obtain the rotation angle of the rotor based on the signal of the rotation angle sensor each time the pulse is input to the stepping motor, and
(iii) the electric valve control device is configured to stop inputting the pulse to the stepping motor when the change in the rotation angle matches the change pattern that is predetermined.

The change pattern includes the change in the rotation angle indicating the rotation in the second direction.

According to the present invention,
(i) the electric valve control device is configured to start inputting a pulse to the stepping motor to rotate the rotor in the first direction,
(ii) the electric valve control device is configured to obtain the rotation angle of the rotor based on the signal of the rotation angle sensor each time the pulse is input to the stepping motor, and
(iii-1) the electric valve control device is configured to stop inputting the pulse to the stepping motor when the change in the rotation angle indicating the rotation in the second direction is detected, or
(iii-2) the electric valve control device is configured to stop inputting the pulse to the stepping motor when the change in the rotation angle indicating the rotation in the first direction is detected after the change in the rotation angle indicating the rotation in the second direction is detected.

When the pulse is input to the stepping motor, a driving current is supplied to a stator, rotating the rotor. Multiple pulses (i.e., the driving currents) are repeatedly input to the stepping motor in a predetermined order. When the rotor rotates in the first direction and reaches the reference position, the electric valve is brought into a state where the rotation of the rotor in the first direction is restricted. When the multiple pulses are further input to the stepping motor in the state, the rotor rotates in the second direction in response to a specific pulse of the multiple pulses being input and then in the first direction in response to another specific pulse of the multiple pulses being input. After that, the rotor reaches the reference position again. Consequently, stopping the pulse input to the stepping motor in response to detection of the change in the rotation angle indicating the rotation in the second direction enables an initialization operation to be finished quickly after the rotor reaches the reference position. Therefore, it is possible to reduce a duration of an initialization operation for an electric valve and suppress noise.

BRIEF DESCRIPTION OF DRAWINGS

FIG. 9 is a diagram schematically illustrating the positional relationship between the magnetic poles of the rotor and the pole teeth of the stator (when pulse P[3] is input).

FIG. 18 is a diagram illustrating examples of change pattern information.

DESCRIPTION OF EMBODIMENTS

An electric valve device 1 according to an embodiment of the present invention is described with reference to FIGS. 1 to 21.

Figure 1:
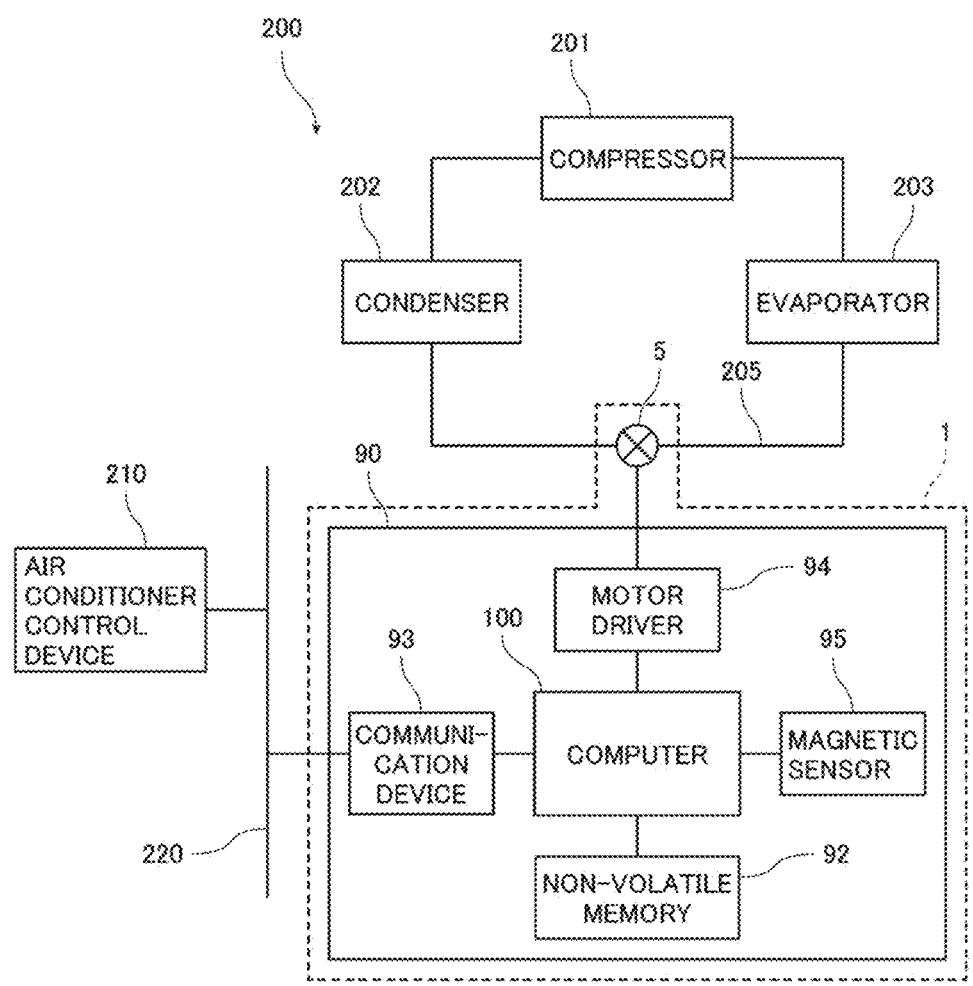
FIG. 1 is a block diagram of an air conditioning system including an electric valve device according to an embodiment of the present invention.
Figure 2:
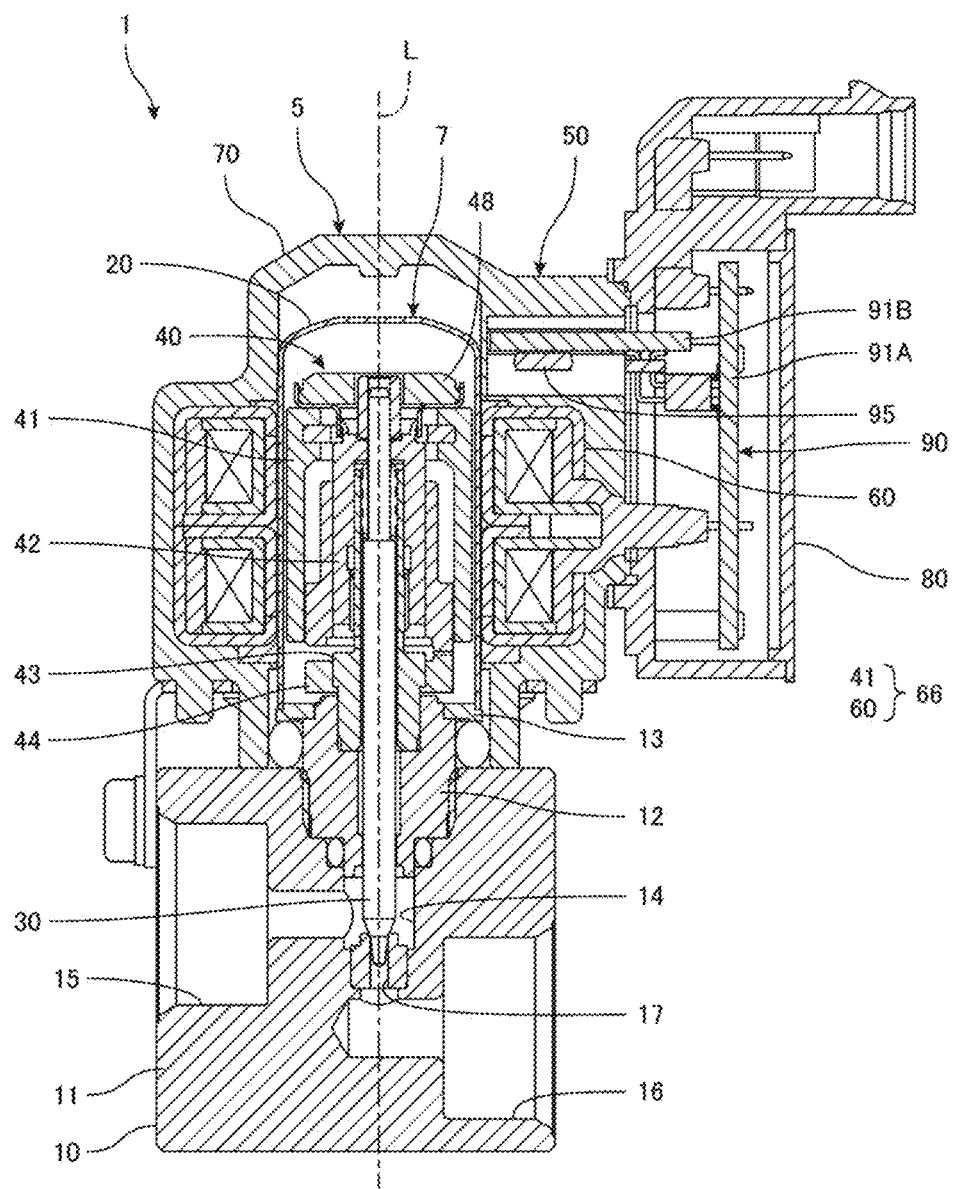
FIG. 2 is a sectional view of the electric valve device in FIG. 1.
Figure 3:
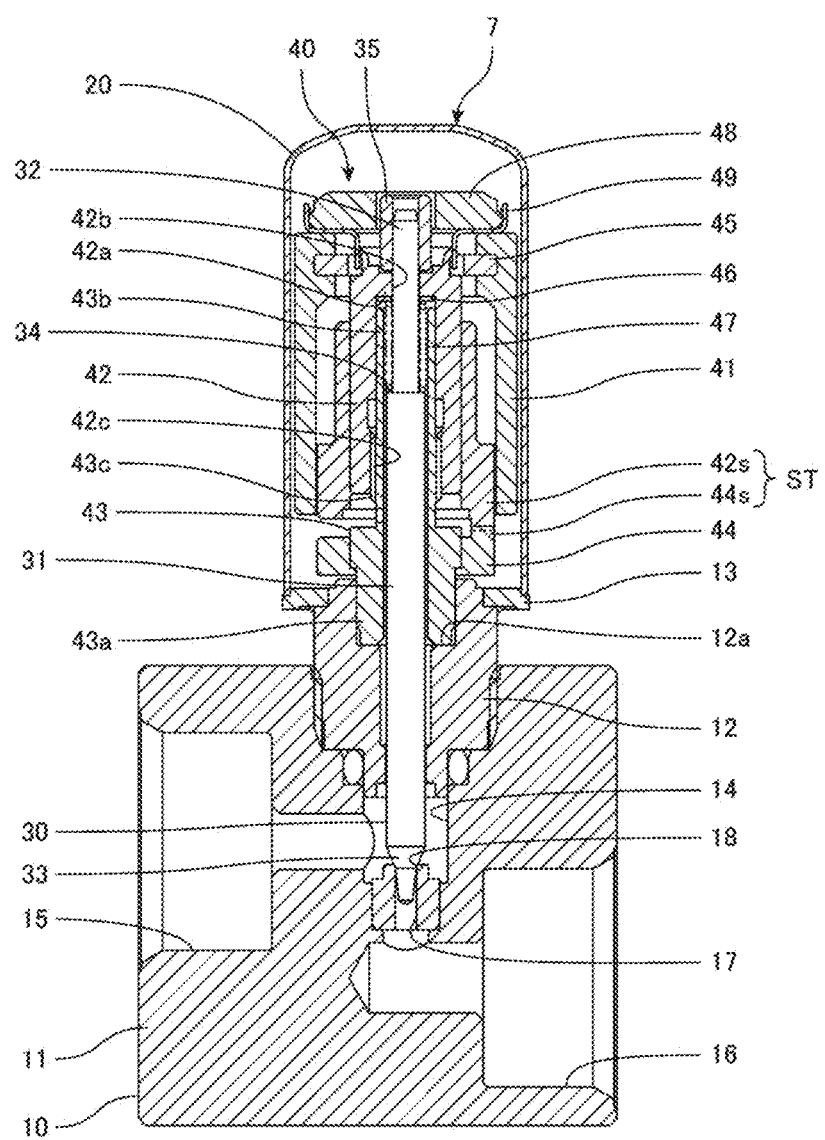
FIG. 3 is a sectional view of a valve body assembly included in the electric valve device in FIG. 2.
Figure 4:
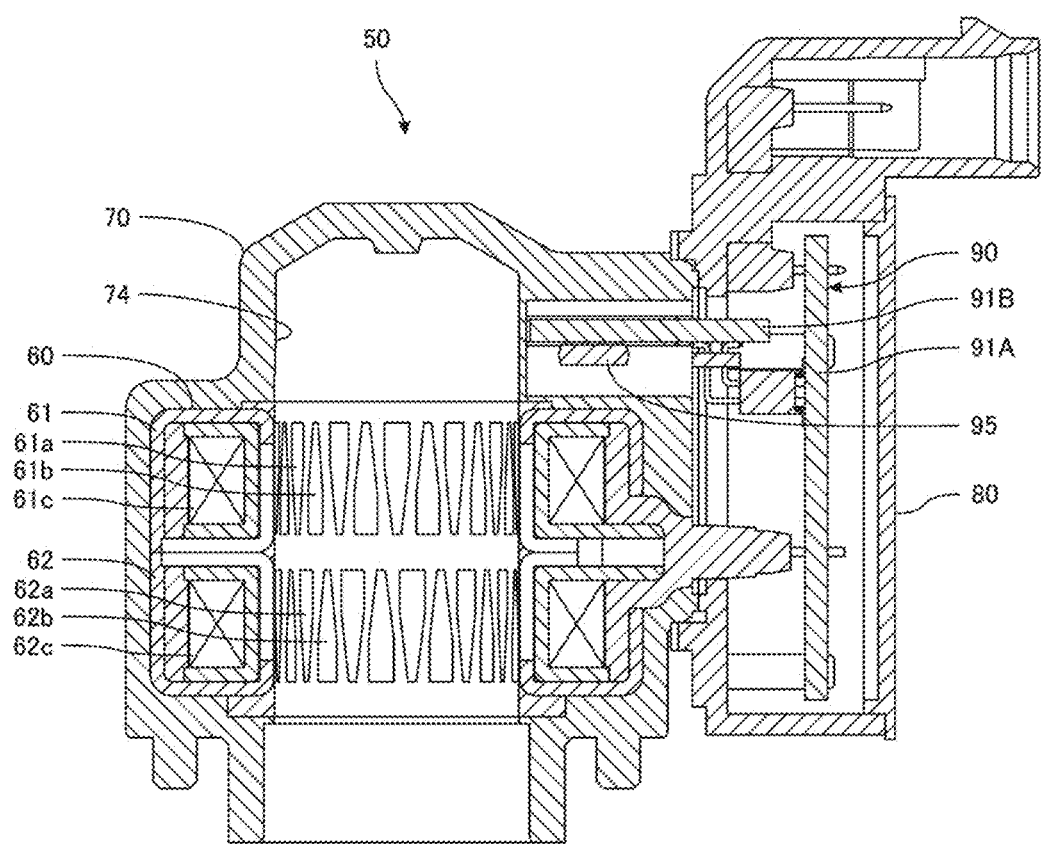
FIG. 4 is a sectional view of a stator unit included in the electric valve device in FIG. 2.
Figure 5:
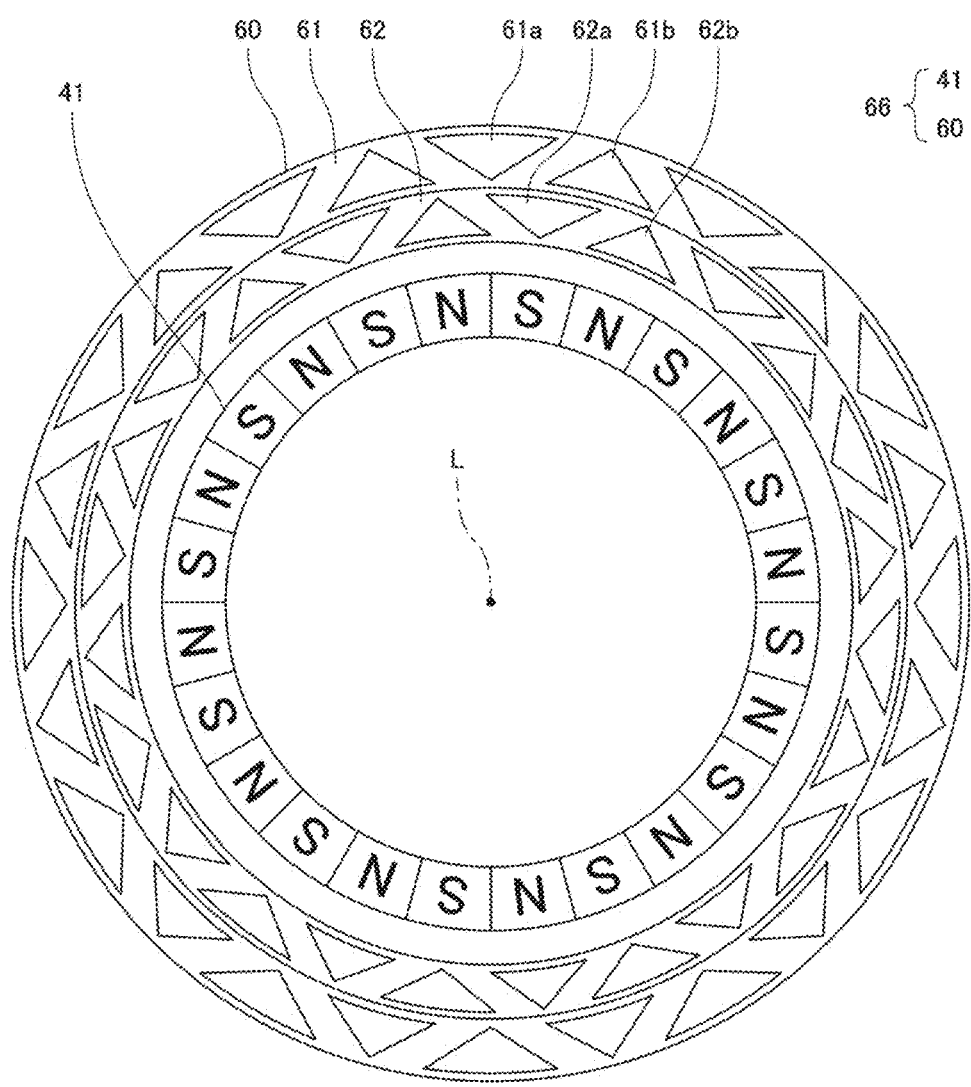
FIG. 5 is a diagram illustrating a rotor and a stator that are included in the electric valve device in FIG. 2.
Figures 6A, 6B:
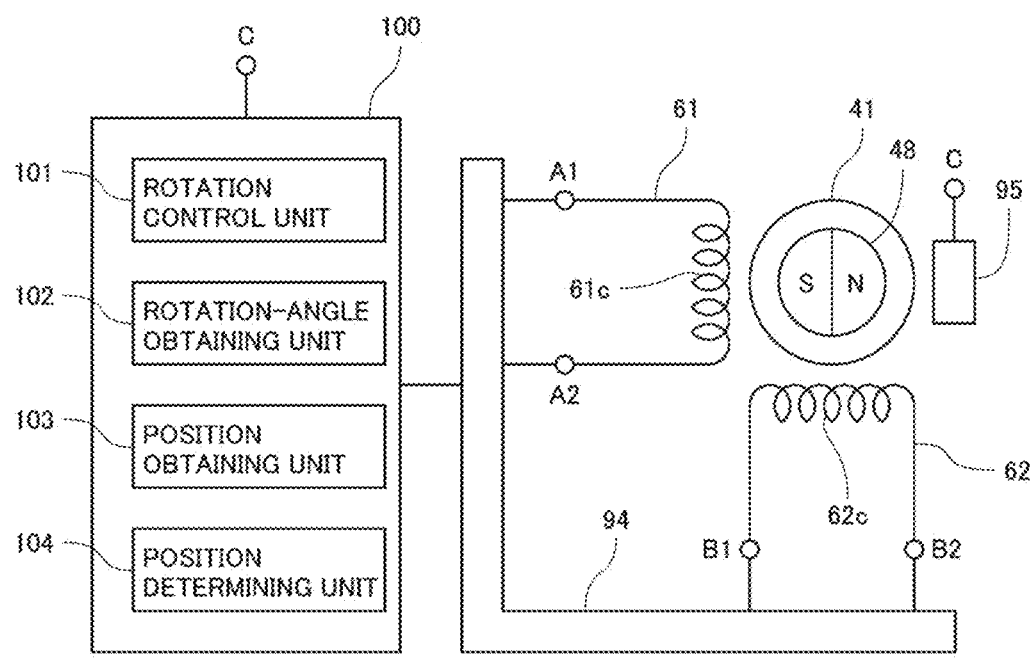
FIG. 6A is a diagram illustrating a computer, a motor driver, a magnetic sensor, a permanent magnet, and a stepping motor that are included in the electric valve device in FIG. 2.
FIG. 6B shows an example of correspondence between pulses and driving currents supplied to a stator.
Figure 7:
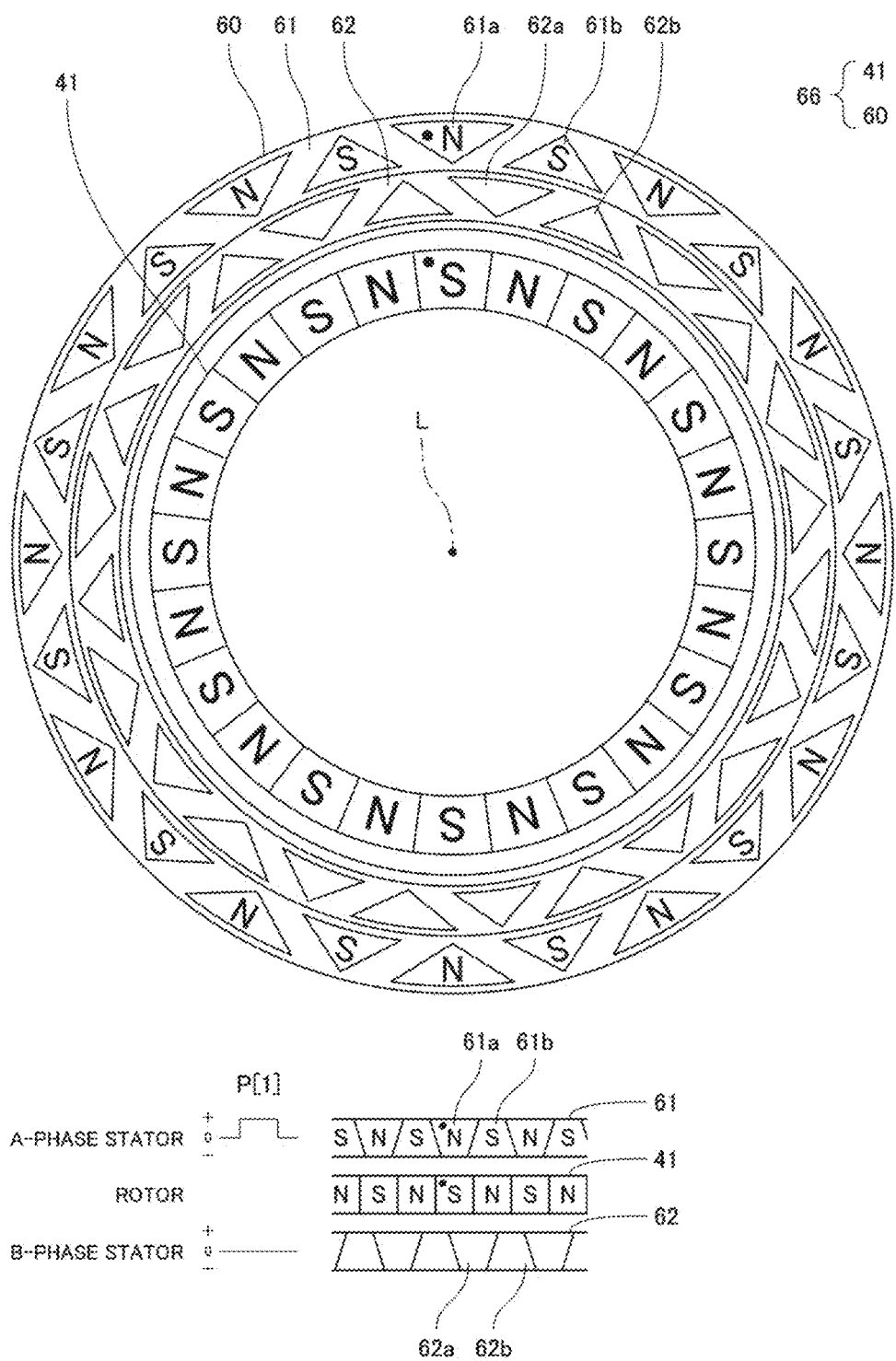
FIG. 7 is a diagram schematically illustrating a positional relationship between magnetic poles of the rotor and pole teeth of the stator (when pulse P[1] is input).
Figure 8:
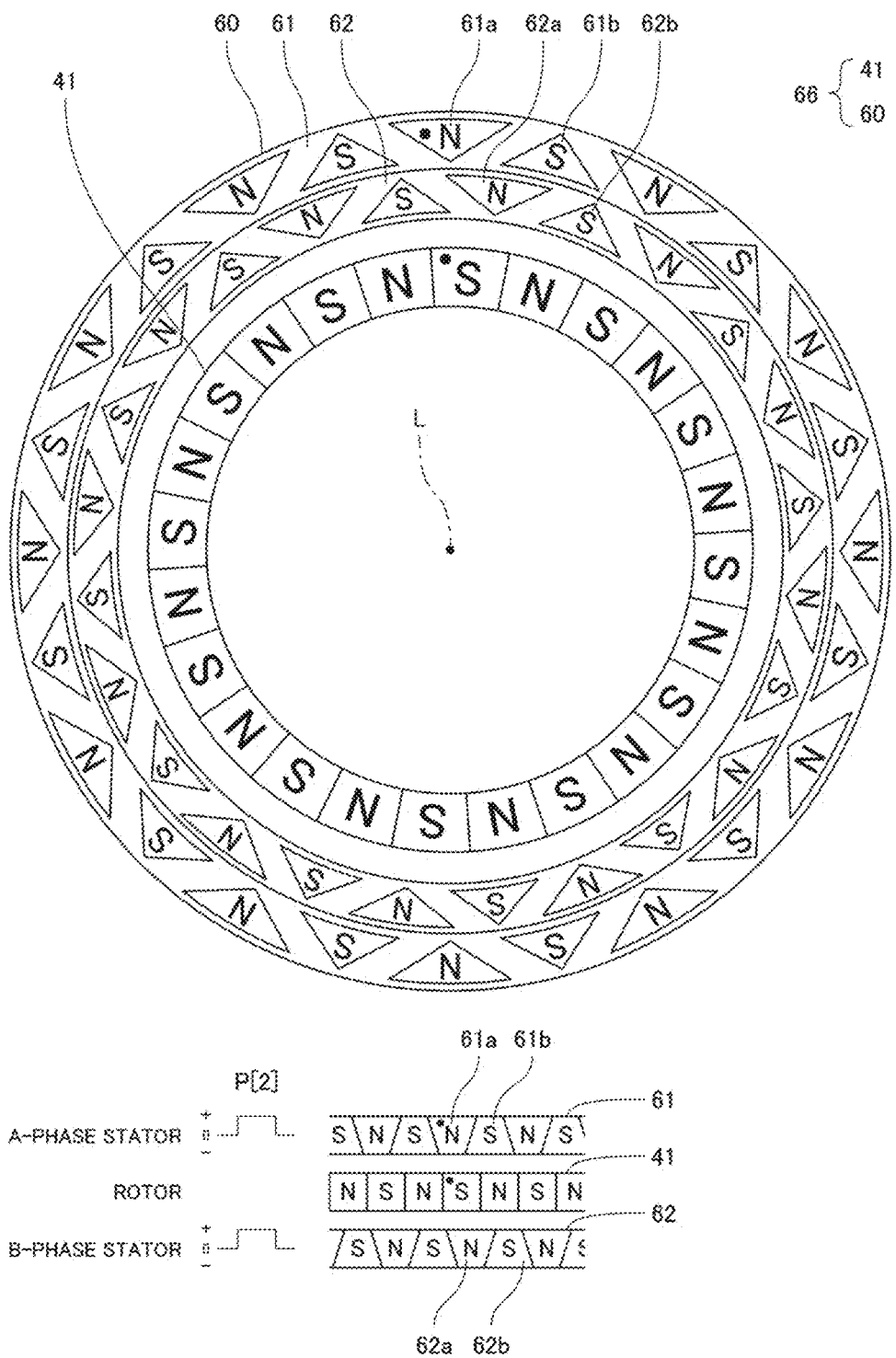
FIG. 8 is a diagram schematically illustrating the positional relationship between the magnetic poles of the rotor and the pole teeth of the stator (when pulse P[2] is input).
Figure 10:
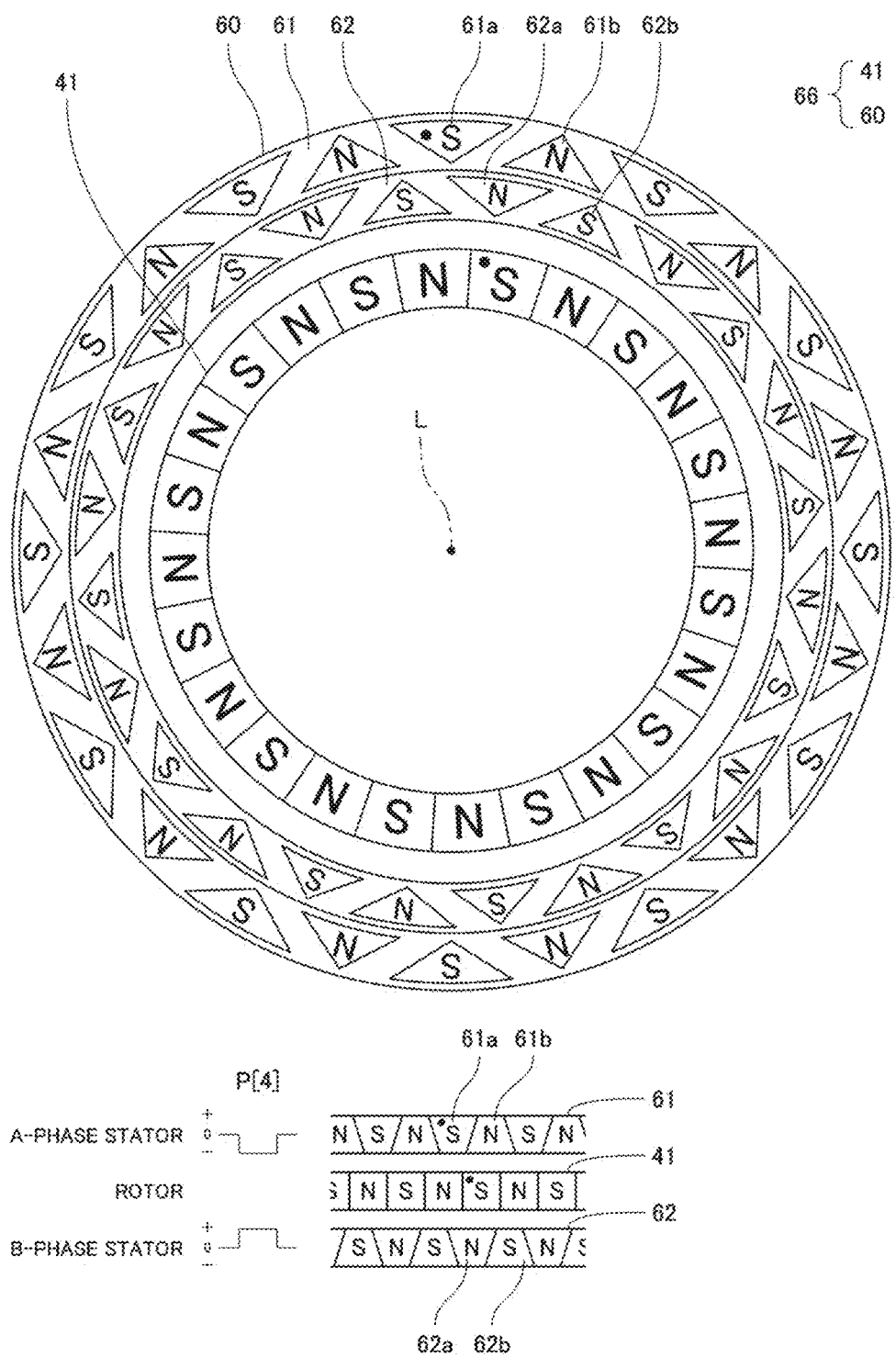
FIG. 10 is a diagram schematically illustrating the positional relationship between the magnetic poles of the rotor and the pole teeth of the stator (when pulse P[4] is input).
Figure 11:
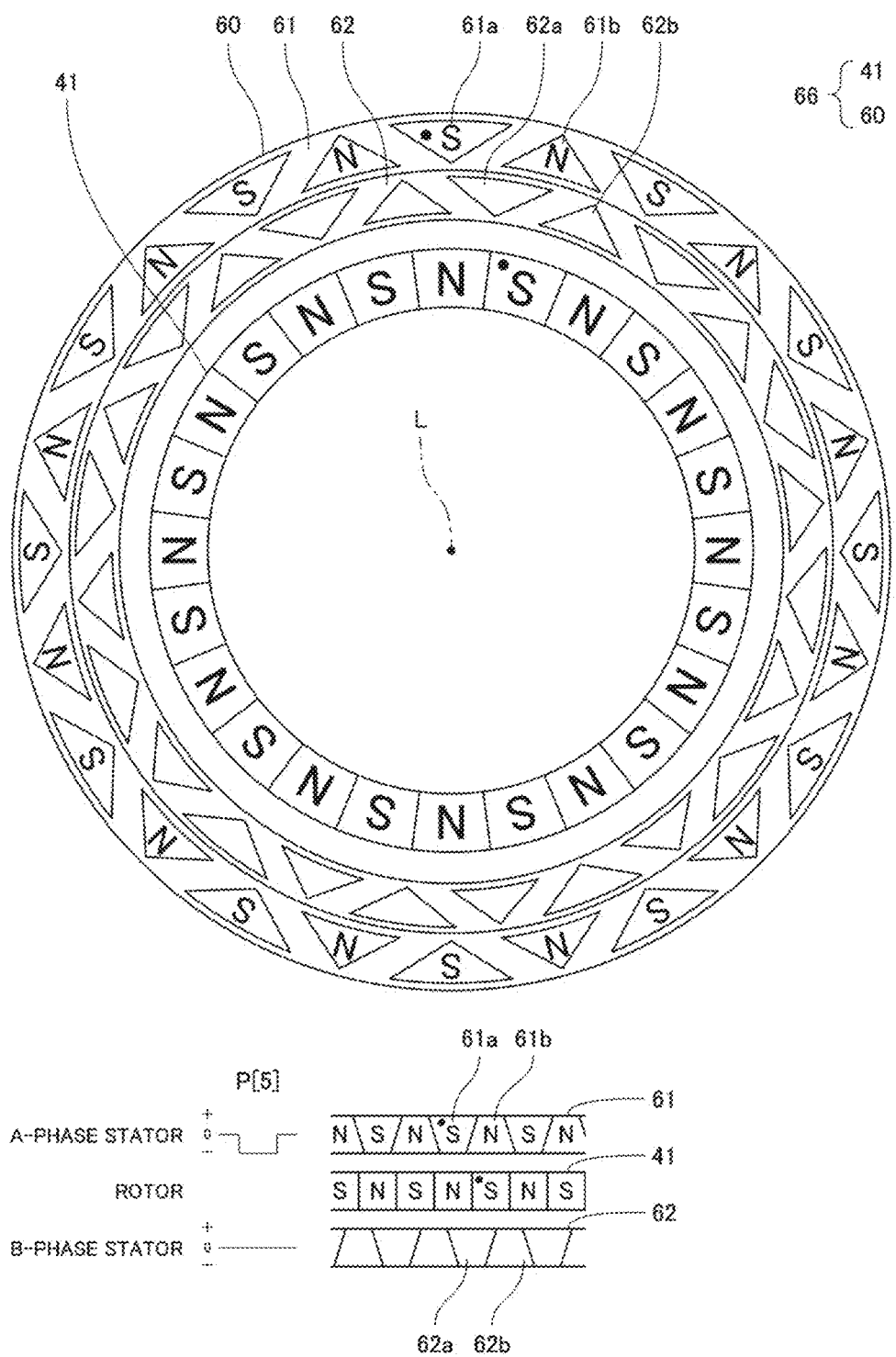
FIG. 11 is a diagram schematically illustrating the positional relationship between the magnetic poles of the rotor and the pole teeth of the stator (when pulse P[5] is input).
Figure 12:
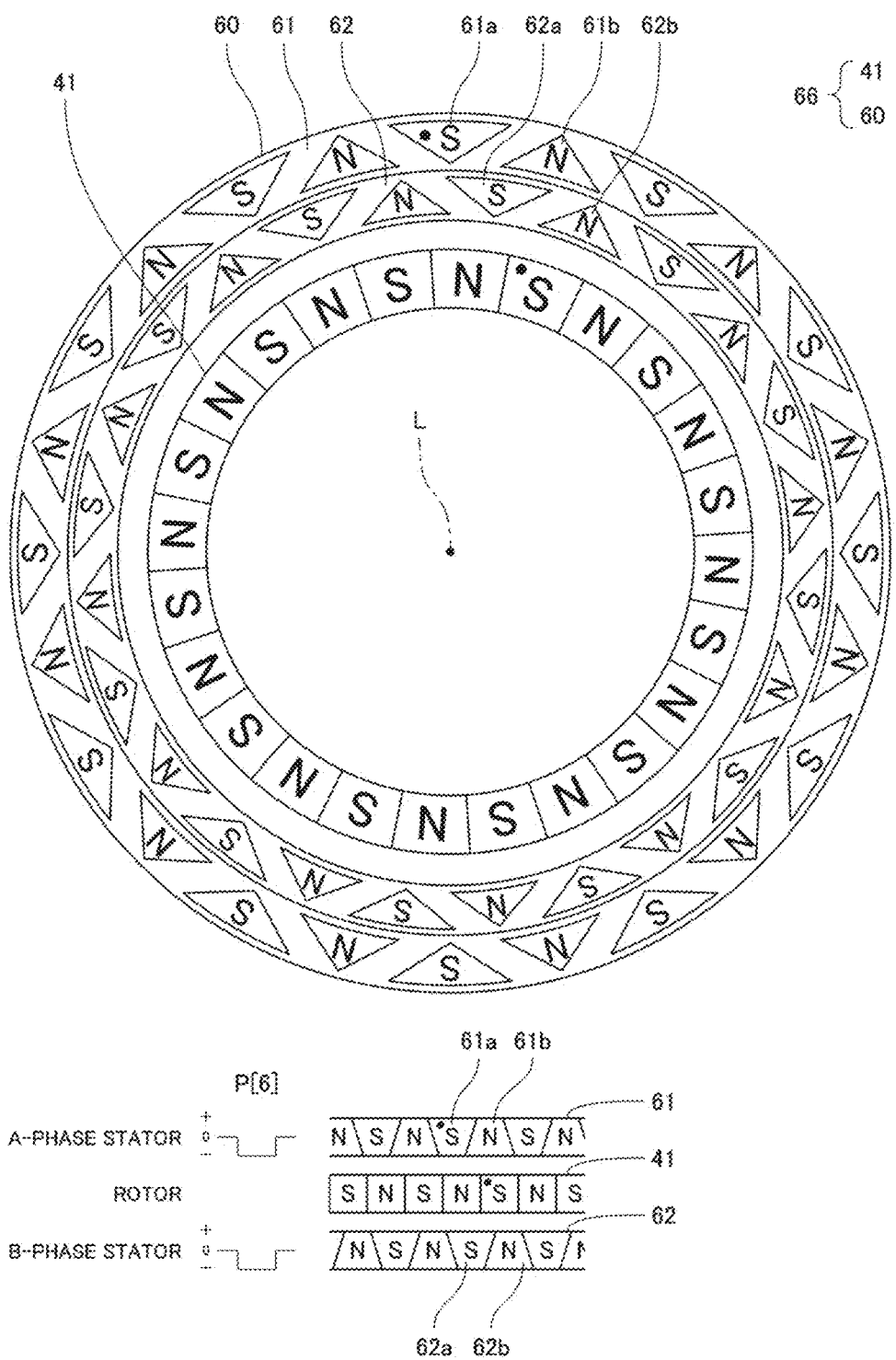
FIG. 12 is a diagram schematically illustrating the positional relationship between the magnetic poles of the rotor and the pole teeth of the stator (when pulse P[6] is input).
Figure 13:
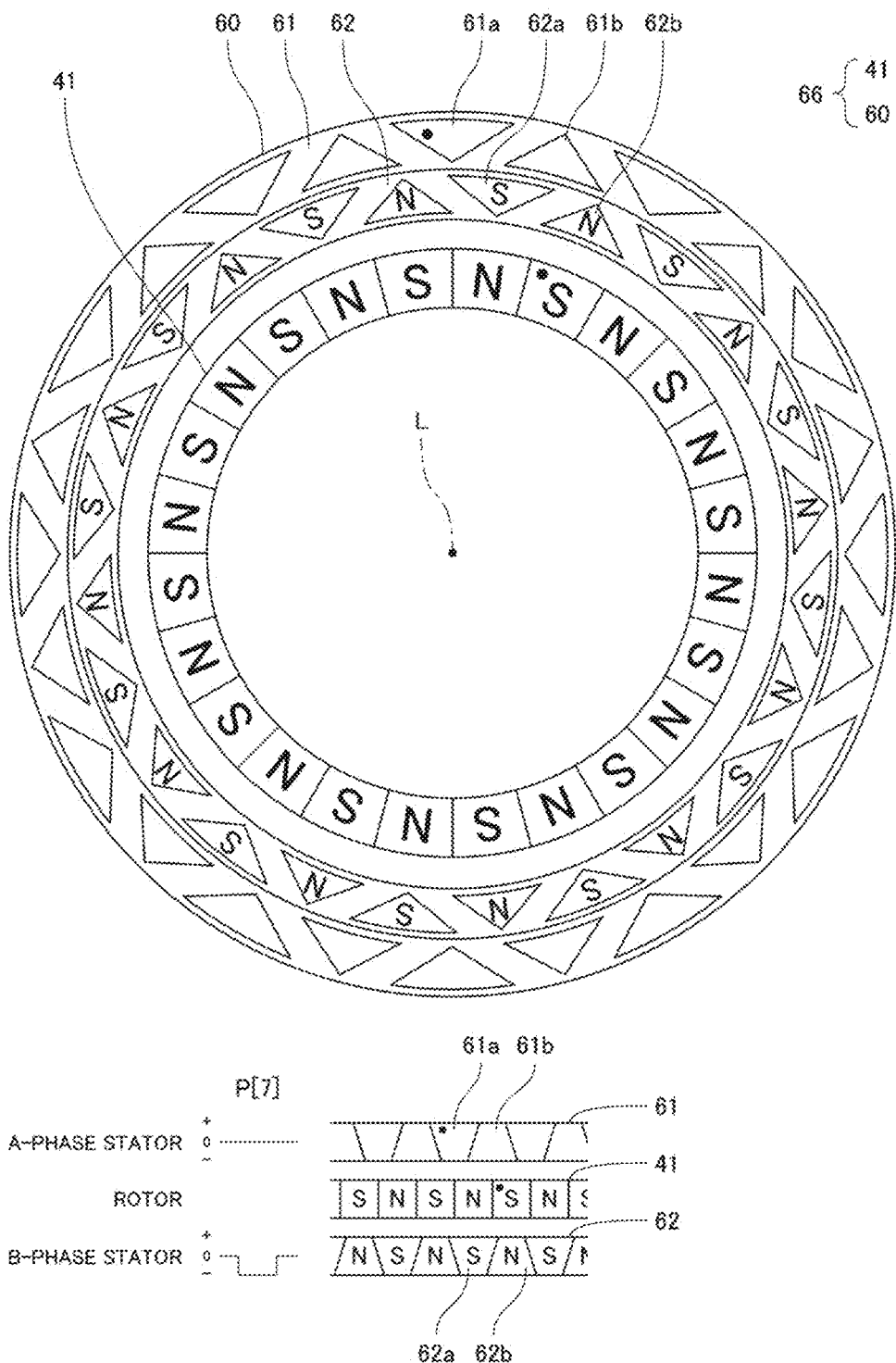
FIG. 13 is a diagram schematically illustrating the positional relationship between the magnetic poles of the rotor and the pole teeth of the stator (when pulse P[7] is input).
Figure 14:
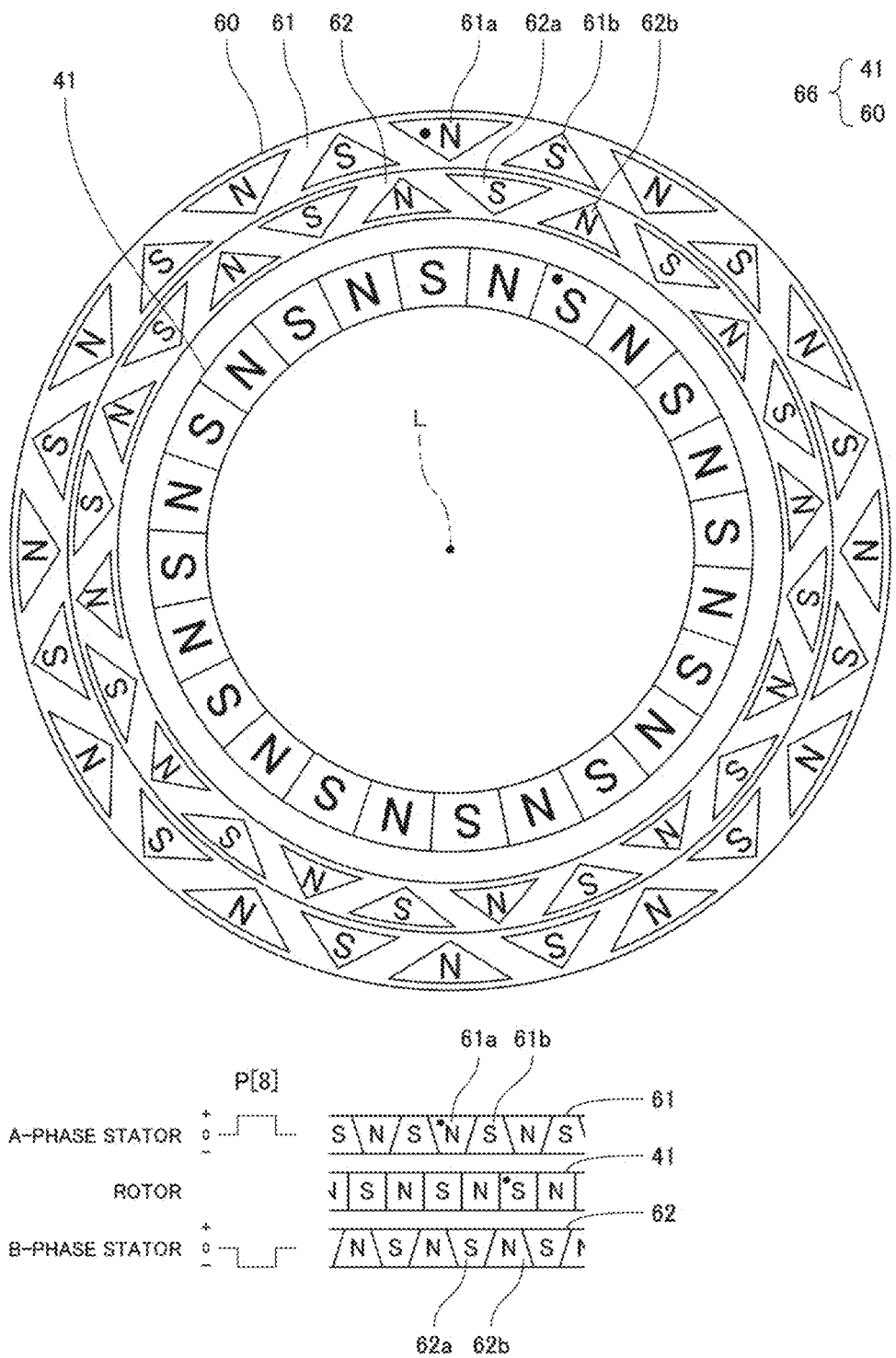
FIG. 14 is a diagram schematically illustrating the positional relationship between the magnetic poles of the rotor and the pole teeth of the stator (when pulse P[8] is input).
Figure 15:
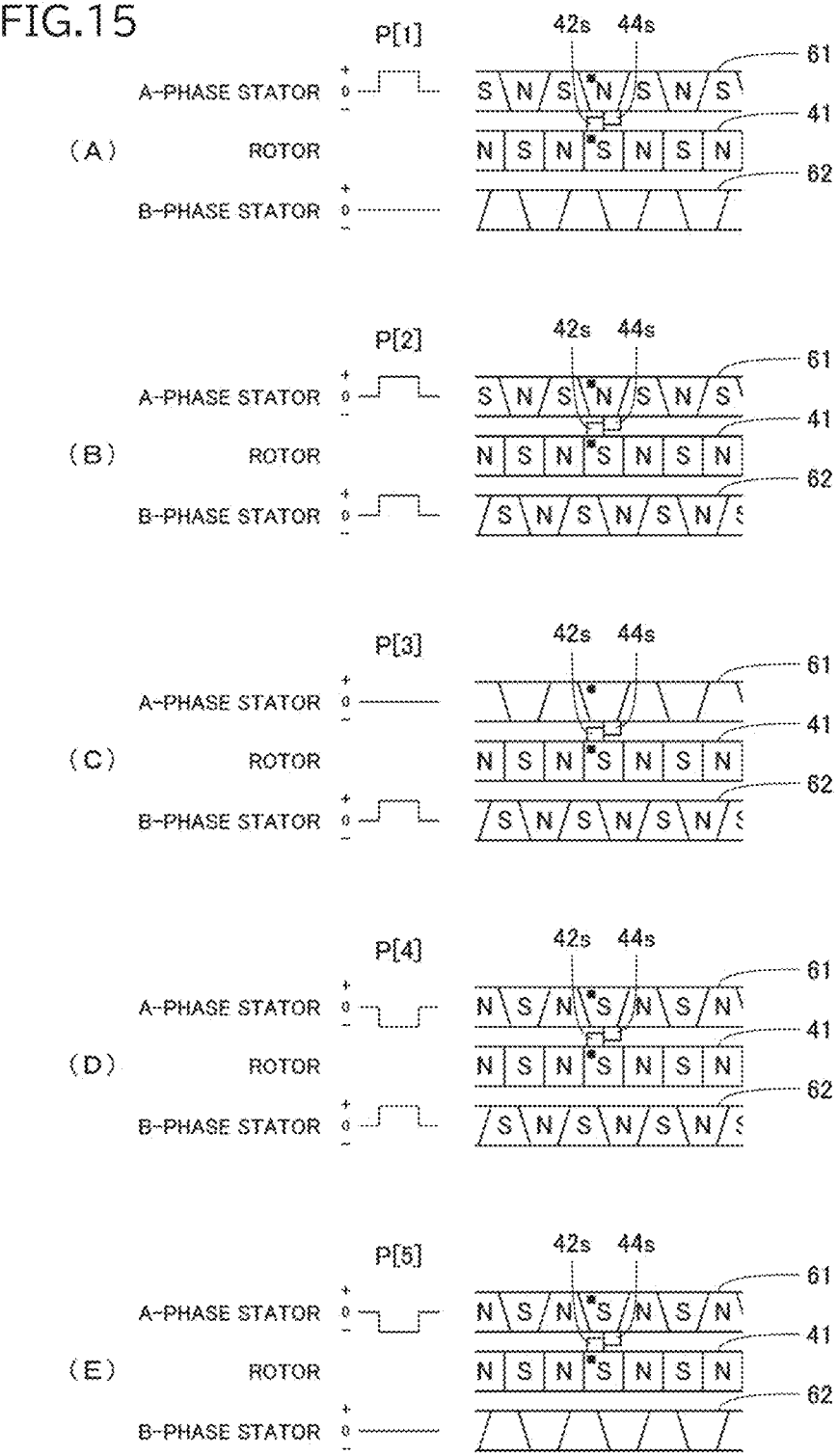
FIG. 15 is a diagram illustrating movement of the rotor when a pulse for rotating the rotor in a first direction is input to the stepping motor in a state where rotation of the rotor in the first direction is restricted.
Figure 16:
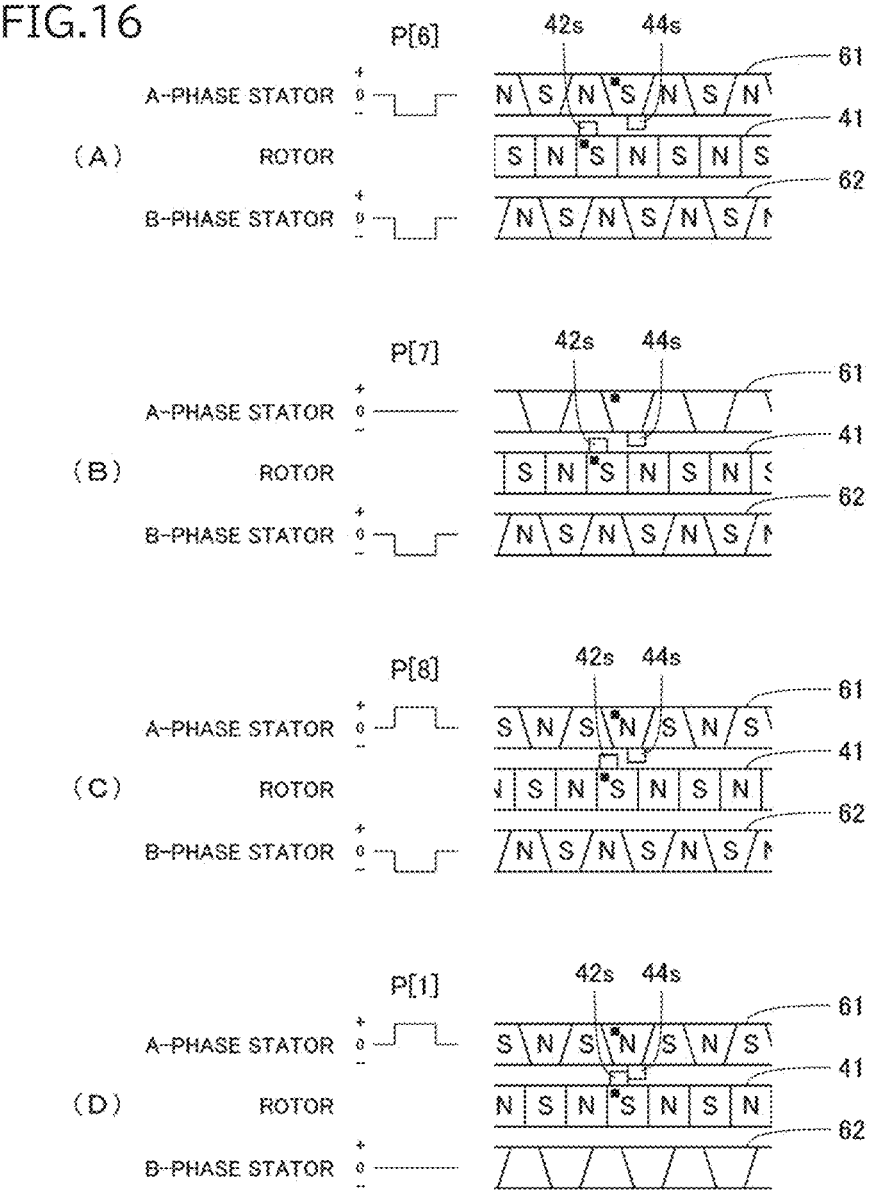
FIG. 16 is a diagram illustrating the movement of the rotor when the pulse for rotating the rotor in the first direction is input to the stepping motor in the state where the rotation of the rotor in the first direction is restricted (following FIG. 15).
Figure 17:
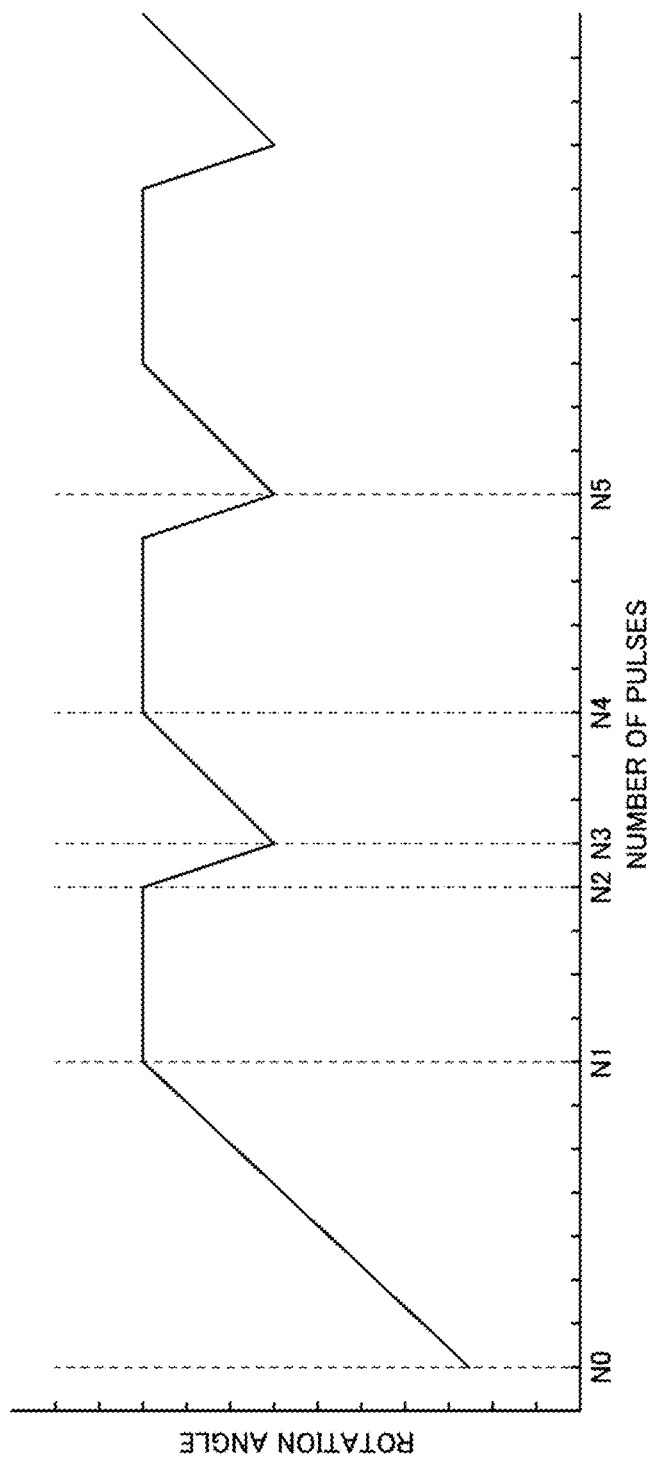
FIG. 17 is a graph showing an example of change in rotation angle of the rotor.
Figure 19:
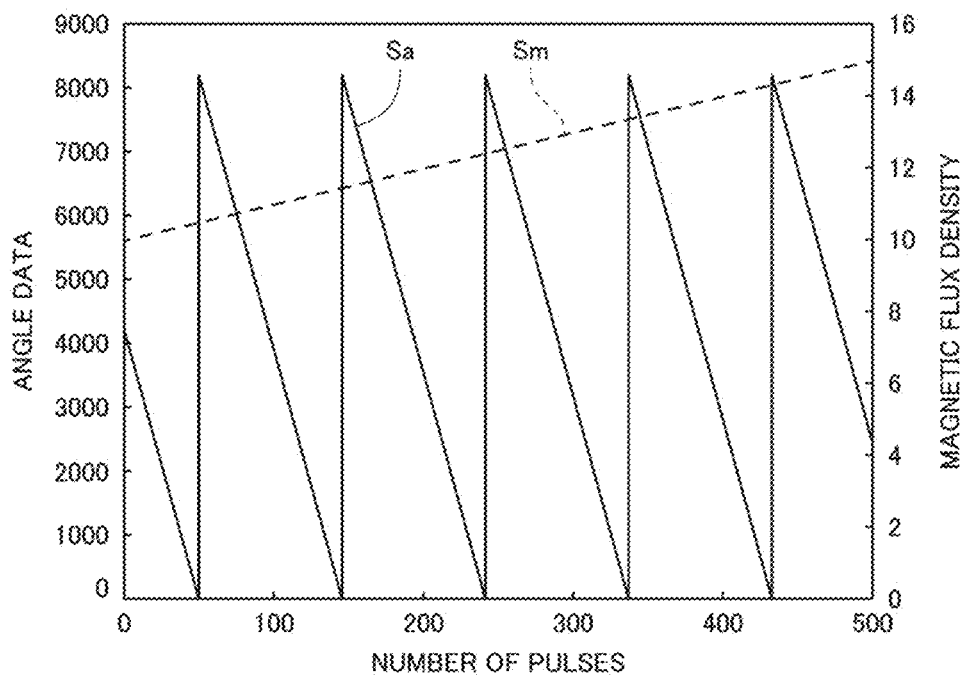
FIG. 19 is a graph showing examples of signals output by the magnetic sensor.
Figure 20:
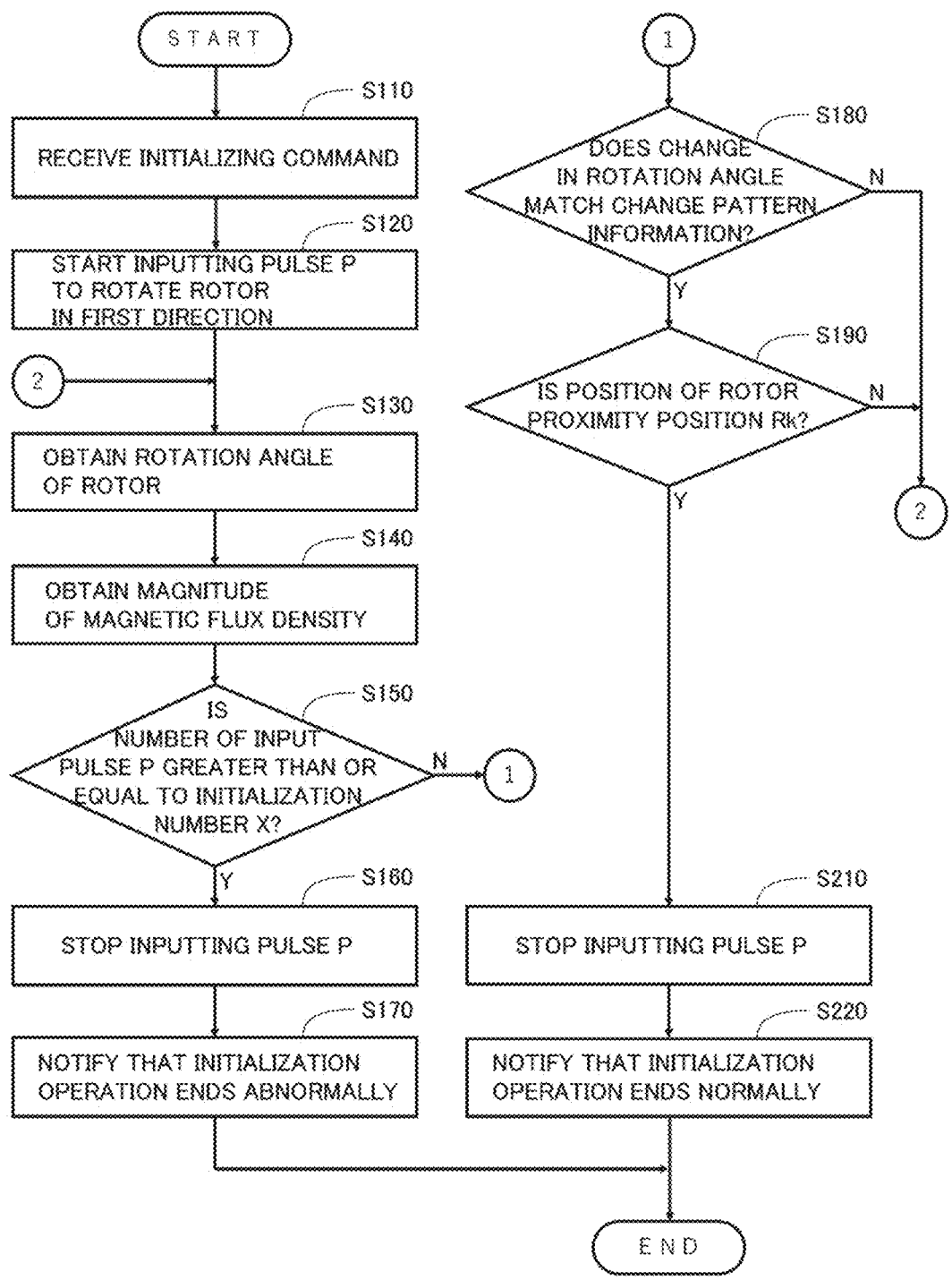
FIG. 20 is a flowchart illustrating an example of an initialization operation performed by the computer included in the electric valve device in FIG. 2.
Figure 21:
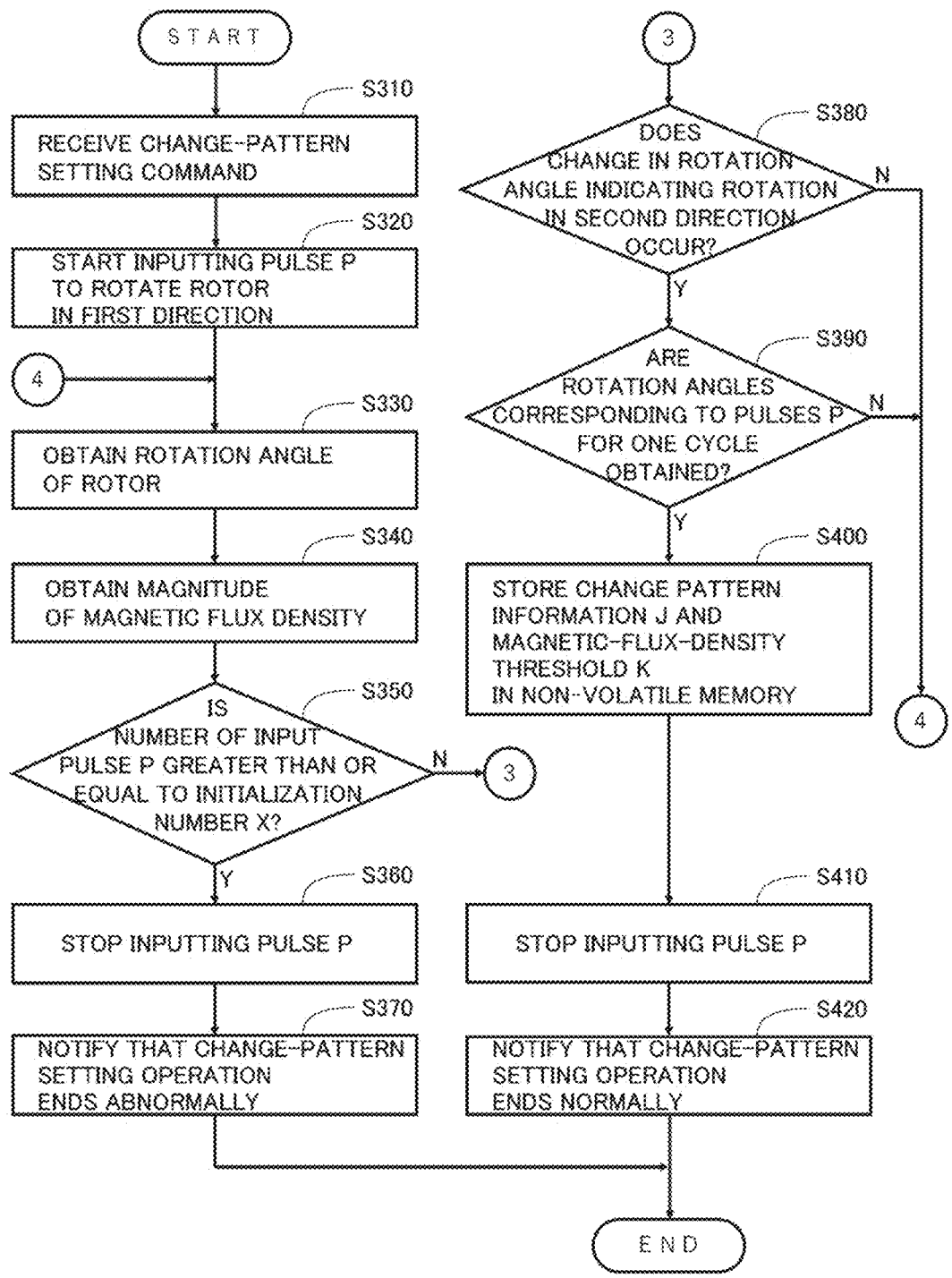
FIG. 21 is a flowchart illustrating an example of a change-pattern setting operation performed by the computer included in the electric valve device in FIG. 2.

FIG. 1 is a block diagram of an air conditioning system including an electric valve device according to the embodiment of the present invention. FIG. 2 is a sectional view of the electric valve device in FIG. 1. FIG. 3 is a sectional view of a valve body assembly included in the electric valve device in FIG. 2. FIG. 4 is a sectional view of a stator unit included in the electric valve device in FIG. 2. FIG. 5 is a diagram illustrating a rotor and a stator that are included in the electric valve device in FIG. 2. FIG. 5 schematically illustrates the rotor and the stator. FIG. 6 is a diagram illustrating a computer, a motor driver, a magnetic sensor, a permanent magnet, and a stepping motor (the rotor and the stator) that are included in the electric valve device in FIG. 2. FIG. 6A schematically illustrates the computer, the motor driver, the magnetic sensor, the permanent magnet, the rotor, and the stator. FIG. 6B shows an example of correspondence between pulses and driving currents supplied to the stator. FIGS. 7 to 14 are diagrams schematically illustrating positional relationships between magnetic poles of the rotor and pole teeth of the stator. FIGS. 7 to 14 correspond to when pulses P[1] to P[8] are input. FIGS. 7 to 14 schematically illustrate the rotor and the stator. FIGS. 15 and 16 are diagrams illustrating movement of the rotor when a pulse for rotating the rotor in a first direction is input to the stepping motor in a state where rotation of the rotor in the first direction is restricted. FIG. 17 is a graph showing an example of change in rotation angle when the rotor is operated to rotate in the first direction. FIG. 18 is a diagram illustrating examples of change pattern information. FIG. 19 is a graph showing examples of signals output by the magnetic sensor. FIG. 20 is a flowchart illustrating an example of an initialization operation performed by the computer included in the electric valve device in FIG. 2. FIG. 21 is a flowchart illustrating an example of a change-pattern setting operation performed by the computer included in the electric valve device in FIG. 2.

FIG. 1 illustrates an example of an air conditioning system 200 mounted in a vehicle. The air conditioning system 200 includes a compressor 201, a condenser 202, the electric valve device 1 (an electric valve 5), and an evaporator 203, which are connected in this order by a pipe 205. The electric valve device 1 functions as an expansion valve. The air conditioning system 200 includes an air conditioner control device 210. The air conditioner control device 210 is connected to the electric valve device 1 and can communicate with the electric valve device 1. The air conditioner control device 210 uses the electric valve device 1 to control the flow rate of refrigerant flowing through the pipe 205.

As illustrated in FIGS. 2 to 4, the electric valve device 1 includes the electric valve 5 and an electric valve control device 90.

The electric valve 5 includes a valve body assembly 7 and a stator unit 50. The valve body assembly 7 includes a valve body 10, a can 20, a valve member 30, and a driving mechanism 40.

The valve body 10 is, for example, made of a metal, such as an aluminum alloy. The valve body 10 includes a body member 11, a cylindrical member 12, and a connection member 13. The body member 11 has a rectangular parallelepiped shape. The cylindrical member 12 projects from the upper surface of the body member 11. The cylindrical member 12 is mounted on the body member 11 by a screw structure. The body member 11 has a valve chamber 14, flow channels 15 and 16, a valve port 17, and a valve seat 18. The flow channel 15 is connected to the valve chamber 14. The flow channel 16 is connected to the valve chamber 14 via the valve port 17. The valve port 17 is enclosed by the valve seat 18 in the valve chamber 14. The connection member 13 has a circular annular plate-like shape. The inner peripheral edge of the connection member 13 is bonded to the upper portion of the cylindrical member 12.

The can 20 is made of a metal, such as stainless steel. The can 20 has a circular cylindrical shape. The can 20 is open at the lower end and is closed at the upper end. The lower end of the can 20 is bonded to the outer peripheral edge of the connection member 13.

The valve member 30 includes a first stem portion 31, a second stem portion 32, a valve portion 33, and a step portion 34. The first stem portion 31 and the second stem portion 32 each have a circular columnar shape. The diameter of the second stem portion 32 is smaller than that of the first stem portion 31. The second stem portion 32 is provided coaxially and continuously with the upper end of the first stem portion 31. The step portion 34 is an annular plane facing upward. The step portion 34 is disposed in the part where the second stem portion 32 is continuous with the first stem portion 31. The valve portion 33 is provided coaxially and continuously with the lower end of the first stem portion 31. The valve portion 33 faces the valve port 17.

The driving mechanism 40 moves the valve member 30 in a direction of an axis L (an up-and-down direction in FIGS. 2 and 3). The movement of the valve member 30 opens and closes the valve port 17. The driving mechanism 40 includes a rotor 41, a valve stem holder 42, a guide bush 43, and a stopper member 44.

The rotor 41 has a circular cylindrical shape. The outer diameter of the rotor 41 is slightly smaller than the inner diameter of the can 20. The rotor 41 is disposed inside the can 20. The rotor 41 is rotatable with respect to the valve body 10 and movable in the direction of the axis L. The rotor 41 has a plurality of north (N) poles and a plurality of south(S) poles. The N poles and the S poles are disposed on the outer circumferential surface of the rotor 41. The N poles and the S poles each extend in the direction of the axis L. The N poles and the S poles are alternately arranged at regular angular intervals in the circumferential direction. In the embodiment, the rotor 41 includes twelve N poles and twelve S poles. The angle between the N pole and the S pole adjacent to each other is 15 degrees.

The valve stem holder 42 has a circular cylindrical shape. The valve stem holder 42 is open at the lower end and is closed at the upper end. The valve stem holder 42 includes an upper wall portion 42a to which a supporting ring 45 is secured. The supporting ring 45 couples the rotor 41 to the valve stem holder 42. The valve stem holder 42 rotates together with the rotor 41. The valve stem holder 42 includes a movable stopper 42s. The valve stem holder 42 has a stem hole 42b. The stem hole 42b is in the upper wall portion 42a of the valve stem holder 42. The second stem portion 32 of the valve member 30 is disposed in the stem hole 42b movably in the direction of the axis L. A push nut 35 for retaining is mounted on the second stem portion 32. The upper wall portion 42a of the valve stem holder 42 has a lower surface on which a washer 46 is disposed. A valve closing spring 47 is disposed between the washer 46 and the step portion 34 of the valve member 30. The valve closing spring 47 is a coil spring and pushes the valve member 30 toward the valve port 17. The inner circumferential surface of the valve stem holder 42 has an internal thread 42c. The movable stopper 42s is fixed with respect to the rotor 41.

The guide bush 43 includes a base portion 43a and a support portion 43b. The base portion 43a has a circular cylindrical shape. The base portion 43a is press-fitted into a fitting hole 12a of the cylindrical member 12. The supporting portion 43b has a circular cylindrical shape. The outer diameter of the supporting portion 43b is smaller than that of the base portion 43a. The inner diameter of the supporting portion 43b is equal to that of the base portion 43a. The supporting portion 43b is provided coaxially and continuously with the upper end of the base portion 43a. The outer circumferential surface of the supporting portion 43b has an external thread 43c. The external thread 43c is screwed into the internal thread 42c of the valve stem holder 42. The first stem portion 31 of the valve member 30 is disposed inside the guide bush 43. The guide bush 43 supports the valve member 30 movably in the direction of the axis L.

The stopper member 44 is mounted on the base portion 43a of the guide bush 43. The stopper member 44 includes a fixed stopper 44s. The fixed stopper 44s is fixed with respect to the valve body 10.

A permanent magnet 48 is disposed above the rotor 41 inside the can 20. The permanent magnet 48 has a circular annular plate-like shape. The permanent magnet 48 has an N pole and an S pole that radially face each other. The permanent magnet 48 is mounted on the rotor 41 by using a fixed member 49 and the supporting ring 45. The permanent magnet 48 is disposed coaxially with the rotor 41. The permanent magnet 48 rotates together with the rotor 41 and moves in the direction of the axis L together with the rotor 41.

The stator unit 50 includes a stator 60, a housing 70, and a case 80.

The stator 60 has a circular cylindrical shape. The stator 60 includes an A-phase stator 61 and a B-phase stator 62.

The A-phase stator 61 includes a plurality of claw-pole type pole teeth 61a and 61b in the inner circumference. In FIG. 5, the radially outward direction of the A-phase stator 61 corresponds to upward, while the radially inward direction corresponds to downward. The tip ends of the pole teeth 61a point downward, and the tip ends of the pole teeth 61b point upward. The pole teeth 61a and the pole teeth 61b are alternately arranged at regular angular intervals in the circumferential direction. In the embodiment, the A-phase stator 61 includes twelve pole teeth 61a and twelve pole teeth 61*b*. The angle between the pole tooth 61*a* and the pole tooth 61*b* adjacent to each other is 15 degrees. When a coil 61*c* of the A-phase stator 61 is energized, the pole teeth 61*a* and the pole teeth 61*b* have opposite polarities.

The B-phase stator 62 includes a plurality of claw-pole type pole teeth 62*a* and 62*b* in the inner circumference. In FIG. 5, the radially outward direction of the B-phase stator 62 corresponds to upward, while the radially inward direction corresponds to downward. The tip ends of the pole teeth 62*a* point downward, and the tip ends of the pole teeth 62*b* point upward. The pole teeth 62*a* and the pole teeth 62*b* are alternately arranged at regular angular intervals in the circumferential direction. In the embodiment, the B-phase stator 62 includes twelve pole teeth 62*a* and twelve pole teeth 62*b*. The angle between the pole tooth 62*a* and the pole tooth 62*b* adjacent to each other is 15 degrees. When a coil 62*c* of the B-phase stator 62 is energized, the pole teeth 62*a* and the pole teeth 62*b* have opposite polarities.

The A-phase stator 61 is disposed coaxially with the B-phase stator 62. The A-phase stator 61 is in contact with the B-phase stator 62. When viewed in the direction of the axis L, the angle between the pole tooth 61*a* of the A-phase stator 61 and the pole tooth 62*a* of the B-phase stator 62 adjacent to each other is 7.5 degrees. In other words, the B-phase stator 62 is in a position where the B-phase stator 62 is rotated relatively to the A-phase stator 61 about the axis L by 7.5 degrees from the position where the pole tooth 61*a* and the pole tooth 62*a* are arranged in the direction of the axis L. As illustrated in FIG. 6A, terminals A1 and A2 of the coil 61*c* of the A-phase stator 61 and terminals B1 and B2 of the coil 62*c* of the B-phase stator 62 are connected to the electric valve control device 90 (a motor driver 94).

The can 20 is disposed inside the stator 60. The rotor 41 is disposed inside the can 20. The stator 60 and the rotor 41 are members of a stepping motor 66.

The rotor 41 is rotated by pulses P (pulses P[1] to P[8]) input to the stepping motor 66. Specifically, the rotor 41 is rotated by driving currents, corresponding to the pulses P, supplied to the stator 60 of the stepping motor 66. In this specification, "inputting the pulses P to the stepping motor 66" is synonymous with "supplying driving currents corresponding to the pulses P to the stator 60 of the stepping motor 66". Pulses P[1] to P[8] are repeatedly input to the stepping motor 66 in ascending or descending order. In other words, pulses P[1] to P[8] are pulses for one cycle and are "multiple pulses P" repeatedly input to the stepping motor 66 in a predetermined order. The step angle of the stepping motor 66 is 3.75 degrees.

Pulses P[1] to P[8] illustrated in FIG. 6B are input to the stepping motor 66 in order. FIGS. 7 to 14 illustrate examples of positional relationships between the rotor 41 and the stator 60 when pulses P[1] to P[8] are input. In FIGS. 7 to 14, the reference pole tooth 61*a* and the reference magnetic pole (S pole) of the rotor 41 are marked with a dot for easy understanding of the positional relationship between the rotor 41 and the stator 60 (the A-phase stator 61 and the B-phase stator 62).

In rotating the rotor 41 in the first direction (clockwise in FIGS. 7 to 14), the pulses P are repeatedly input to the stepping motor 66 in ascending order (in the order from pulse P[1] to pulse P[8]). When the rotor 41 rotates in the first direction, the screw-feed action of the internal thread 42*c* of the valve stem holder 42 and the external thread 43*c* of the guide bush 43 moves the rotor 41 and the valve stem holder 42 downward. This means that the rotor 41 moves toward the valve port 17. The permanent magnet 48 moves downward together with the rotor 41. The rotor 41 (the valve stem holder 42) pushes the valve member 30 downward via the valve closing spring 47. The valve member 30 moves downward, and the valve portion 33 comes into contact with the valve seat 18. At this time, the rotor 41 is at a valve closing position Rc. When the rotor 41 at this position further rotates in the first direction, the valve closing spring 47 is compressed and the rotor 41 and the valve stem holder 42 further move downward. The valve member 30 does not move downward. When the movable stopper 42*s* of the valve stem holder 42 comes into contact with the fixed stopper 44*s* of the stopper member 44, the rotation of the rotor 41 in the first direction is restricted. At this time, the rotor 41 is at a reference position Rx. The movable stopper 42*s* and the fixed stopper 44*s* are members of a stopper mechanism ST that restricts the rotation of the rotor 41 in the first direction.

The change in the rotation angle of the rotor 41 when the pulses P are input to the stepping motor 66 in ascending order in a state where the rotation of the rotor 41 in the first direction is restricted is described with reference to FIGS. 15 to 17. In FIGS. 15 and 16, the reference pole tooth 61*a* and the reference magnetic pole (S pole) of the rotor 41 are marked with a black square for easy understanding of the positional relationship between the rotor 41 and the stator 60 (the A-phase stator 61 and the B-phase stator 62). In FIGS. 15 and 16, the rightward direction corresponds to the first direction, while the leftward direction corresponds to the second direction. In FIG. 17, the horizontal axis corresponds to the number of pulses input to the stepping motor 66, while the vertical axis corresponds to the rotation angle of the rotor 41. Each division on the horizontal axis corresponds to a single pulse, while each division on the vertical axis corresponds to the step angle. In FIG. 17, the rotation angle increases when the rotor 41 rotates in the first direction and decreases when the rotor 41 rotates in the second direction.

When the pulses P are input to the stepping motor 66 in ascending order, the rotor 41 rotates in the first direction to increase the rotation angle (N0 to N1 in FIG. 17). When, for example, pulse P[1] is input to the stepping motor 66, the rotor 41 is positioned at the reference position Rx (FIG. 15A, N1 in FIG. 17). At this time, the movable stopper 42*s* is in contact with the fixed stopper 44*s*, and the rotation of the rotor 41 in the first direction is restricted. When pulses P[2], P[3], P[4], and P[5] are then input to the stepping motor 66, the rotor 41 does not rotate and the rotation angle of the rotor 41 does not change (FIGS. 15B to 15E, N1 to N2 in FIG. 17). When pulse P[6] is then input to the stepping motor 66, the rotor 41 rotates in the second direction (FIG. 16A, N2 to N3 in FIG. 17). The rotation angle of the rotor 41 at this time is three times the step angle. When pulses P[7], P[8], and P[1] are then input to the stepping motor 66, the rotor 41 rotates in the first direction by the step angle each time the pulse P is input, and the rotor 41 is positioned at the reference position Rx again (FIGS. 16B to 16D, N3 to N4 in FIG. 17). After that, in response to the pulses P input to the stepping motor 66, the rotation angle of the rotor 41 repeatedly changes in the same manner as that in the period from N1 to N4 in FIG. 17.

In rotating the rotor 41 in the second direction opposite to the first direction (counter clockwise in FIGS. 7 to 14), pulses P are repeatedly input to the stepping motor 66 in descending order (in the order from pulse P[8] to pulse P[1]). When the rotor 41 rotates in the second direction, the screw-feed action of the internal thread 42*c* of the valve stem holder 42 and the external thread 43*c* of the guide bush 43 moves the rotor 41 and the valve stem holder 42 upward. This means that the rotor 41 moves away from the valve port 17. The permanent magnet 48 moves upward together with the rotor 41. The rotor 41 (the valve stem holder 42) pushes the push nut 35 upward. The valve member 30 moves upward together with the push nut 35, and the valve member 30 moves away from the valve seat 18. When the rotor 41 further rotates in the second direction, the rotor 41 reaches a full-open position Rz. When the rotor 41 reaches the full-open position Rz, the valve member 30 is positioned farthest from the valve port 17.

The housing 70 is made of synthetic resin. The housing 70 is formed by injection molding. The housing 70 houses the stator 60. The housing 70 may be formed by integrally molding (insert molding) with the stator 60. The stator 60 and the housing 70 may be manufactured separately, and the stator 60 may be fitted inside the housing 70. The housing 70 and the stator 60 form an inner space 74 of the stator unit 50. The can 20 is inserted into the inner space 74, and the stator 60 is disposed on the outer circumferential surface of the can 20.

The case 80 is made of synthetic resin. The case 80 is located laterally adjacent to the housing 70. The case 80 is bonded to the housing 70.

In the electric valve 5, the respective central axes of the valve port 17, the can 20, the valve member 30, the rotor 41, the valve stem holder 42, the guide bush 43, the permanent magnet 48, the stator 60 (the A-phase stator 61 and the B-phase stator 62) are aligned with the axis L.

The electric valve control device 90 includes a main circuit board 91A and a sub circuit board 91B. The main circuit board 91A is housed in the case 80. The sub circuit board 91B is disposed across the housing 70 and the case 80. The sub circuit board 91B is electrically connected to the main circuit board 91A.

As illustrated in FIG. 1, the electric valve control device 90 includes a non-volatile memory 92, a communication device 93, the motor driver 94, a magnetic sensor 95, and a computer 100. These are mounted on the main circuit board 91A and the sub circuit board 91B. The electric valve control device 90 controls the electric valve 5 according to a command received from the air conditioner control device 210.

The non-volatile memory 92 stores data required to be held even if power is turned off. The non-volatile memory 92 is, for example, EEPROM or flash memory. The non-volatile memory 92 stores an initialization number X, change pattern information J, and a magnetic-flux-density threshold K.

The initialization number X is the number of pulses input to the stepping motor 66 to position the rotor 41 at the reference position Rx. The initialization number X is set to ensure that the movable stopper 42s comes into contact with the fixed stopper 44s when the rotor 41 rotates in the first direction. The initialization number X is set based on the number of pulses (a full-stroke number) input to the stepping motor 66 when the rotor 41 rotates from the full-open position Rz to the reference position Rx. The initialization number X is, for example, set to 1.2 times the full-stroke number.

The change pattern information J is information indicating the change in the rotation angle of the rotor 41 when the pulses P are input to the stepping motor 66 in ascending order in a state where the rotor 41 is at the reference position Rx. The state where the rotor 41 is at the reference position Rx is a state where the rotation of the rotor 41 in the first direction is restricted by the stopper mechanism ST. The change pattern information J is, for example, stored in the non-volatile memory 92 on shipment from the factory. The change pattern information J is set according to the rotation angle of a magnetic field actually detected by the magnetic sensor 95. In the embodiment, change information is set in correspondence with pulses P[1] to P[8]. The change pattern information J corresponds to a change pattern.

FIG. 18A illustrates an example of the change pattern information J in the embodiment. The change pattern information J contains a combination of the pulses P and change information. The change information concerns the change in the rotation angle of the rotor 41. In the change information, "1" indicates the rotation in the first direction, "2" indicates the rotation in the second direction, and "0" indicates no rotation (no change in the rotation angle). The change pattern information J in FIG. 18A represents that the rotor 41 rotates in the first direction when pulses P[7], P[8], and P[1] are input to the stepping motor 66 in this order, the rotor 41 does not rotate when pulses P[2], P[3], P[4], and P[5] are input to the stepping motor 66 in this order, and the rotor 41 rotates in the second direction when pulse P[6] is input to the stepping motor 66.

The change information in the change pattern information J may be set to information other than "1", "2", and "0" above. For example, as illustrated in FIG. 18B, the change information in the change pattern information J may be set to the amount of change in the rotation angle of the rotor 41 in response to the pulse P. A positive angle indicates the rotation in the first direction, while a negative angle indicates the rotation in the second direction. The change information in the change pattern information J need not correspond to the pulse P. For example, as illustrated in FIG. 18C, the change pattern information J may include the change information and the order of the change information. The change pattern information J needs only to include at least information indicating the rotation in the second direction.

The magnetic-flux-density threshold K is used to determine whether or not the rotor 41 is at a proximity position Rk or a position nearer the reference position Rx than is the proximity position Rk. Specifically, the magnetic-flux-density threshold K is set as a value corresponding to the magnitude of magnetic flux density (the strength of the magnetic field) detected by the magnetic sensor 95 when the rotor 41 is positioned at the proximity position Rk. The proximity position Rk is, for example, a position between the reference position Rx and the valve closing position Rc. The magnetic-flux-density threshold K is set according to the magnitude of the magnetic flux density actually detected by the magnetic sensor 95. The magnetic-flux-density threshold K is, for example, stored in the non-volatile memory 92 on shipment from the factory.

The communication device 93 is connected to the air conditioner control device 210 via a wired communication bus 220 and is able to communicate with the air conditioner control device 210. For example, the air conditioning system 200 utilizes a communication system such as Local Interconnect Network (LIN) or Controller Area Network (CAN). The communication device 93 may be wirelessly connected to the air conditioner control device 210 and be able to wirelessly communicate with the air conditioner control device 210.

The motor driver 94 supplies the driving currents to the stepping motor 66 based on the pulses P input from the computer 100. FIG. 6B illustrates an example of correspondence between the pulses P and the driving currents supplied by the motor driver 94. In FIG. 6B, (+) denotes supplying the driving current flowing from the terminal A1 to the terminal A2 or the driving current flowing from the terminal B1 to the terminal B2, (−) denotes supplying the driving current flowing from the terminal A2 to the terminal A1 or the driving current flowing from the terminal B2 to the terminal B1, and (0) denotes supplying no driving current.

The magnetic sensor 95 is mounted on the sub circuit board 91B. The magnetic sensor 95 is disposed near the upper end of the can 20. The magnetic sensor 95 laterally faces the permanent magnet 48 with the can 20 in between. The sub circuit board 91B may be disposed above the can 20, and the magnetic sensor 95 may face the permanent magnet 48 in the direction of the axis L with the can 20 in between.

The magnetic sensor 95 detects the magnetic field generated by the permanent magnet 48 mounted on the rotor 41.

The magnetic sensor 95 outputs a signal (a rotation angle signal Sa) corresponding to the rotation angle of the magnetic field. The rotation angle signal Sa is a signal corresponding to the rotation angle of the rotor 41. The magnetic sensor 95 is a rotation angle sensor outputting a signal corresponding to the rotation angle of the rotor 41. The electric valve control device 90 may use a sensor other than a magnetic sensor as a rotation angle sensor.

The magnetic sensor 95 outputs a signal (a magnetic-flux-density signal Sm) corresponding to the magnitude of the magnetic flux density. The magnitude of the magnetic flux density detected by the magnetic sensor 95 changes in correspondence with the position of the permanent magnet 48 (the rotor 41) in the direction of the axis L. The magnitude of the magnetic flux density detected by the magnetic sensor 95 is minimized when the rotor 41 is at the reference position Rx and maximized when the rotor 41 is at the full-open position Rz. The magnetic-flux-density signal Sm is a signal (a position signal) corresponding to the position of the rotor 41. The magnetic sensor 95 is a position sensor outputting a signal corresponding to the position of the rotor 41. The electric valve control device 90 may use a sensor other than a magnetic sensor as a position sensor.

FIG. 19 illustrates examples of the rotation angle signal Sa and the magnetic-flux-density signal Sm when the rotor 41 rotates from the reference position Rx (where the number of pulses is 0) to the full-open position Rz (where the number of pulses is 500). In FIG. 19, a solid line is a graph representing the rotation angle signal Sa, while a dashed line is a graph representing the magnetic-flux-density signal Sm. The horizontal axis corresponds to the number of pulses. The vertical axis corresponds to angle data and the magnitude of the magnetic flux density that are output by the magnetic sensor 95. The value indicated by the rotation angle signal Sa (the angle data) corresponds to 0 to 360 degrees. The value indicated by the magnetic-flux-density signal Sm (the magnitude of the magnetic flux density) decreases when the permanent magnet 48 moves downward and increases when the permanent magnet 48 moves upward.

In the embodiment, the rotation angle signal Sa is represented by a voltage value corresponding to the angle of the rotor 41. The computer 100 uses the value (the angle data) obtained by analog-to-digital converting the rotation angle signal Sa. The rotation angle of the rotor 41 is calculated by using the angle data. The computer 100 may use the rotation angle signal Sa (the angle data) as information indicating the rotation angle of the rotor 41.

In the embodiment, the magnetic-flux-density signal Sm is represented by a voltage value corresponding to the position of the rotor 41. The computer 100 uses the value obtained by analog-to-digital converting the magnetic-flux-density signal Sm as information indicating the position of the rotor 41.

The computer 100 is a microcomputer for embedded devices that incorporates a CPU, ROM, RAM, an input/output interface, an analog-to-digital converter, or the like in a single package. The computer 100 may incorporate the non-volatile memory 92, the communication device 93, and the motor driver 94. The CPU executes a program stored in the ROM, and the computer 100 consequently functions as a rotation control unit 101, a rotation-angle obtaining unit 102, a position obtaining unit 103, and a position determining unit 104.

The rotation control unit 101 inputs the pulses P to the stepping motor 66 to rotate the rotor 41 in the first direction or the second direction. Specifically, the rotation control unit 101 receives the command from the air conditioner control device 210 and inputs pulses P[1] to P[8] to the motor driver 94 according to the command. The motor driver 94 supplies the driving currents to the coil 61c of the A-phase stator 61 and the coil 62c of the B-phase stator 62 corresponding to pulses P[1] to P[8] input by the rotation control unit 101.

The rotation-angle obtaining unit 102 obtains the rotation angle of the rotor 41. Specifically, the rotation-angle obtaining unit 102 obtains the rotation angle of the rotor 41 based on the rotation angle signal Sa output by the magnetic sensor 95 each time the rotation control unit 101 inputs the pulse P to the stepping motor 66.

The position obtaining unit 103 obtains the position of the rotor 41 in the direction of the axis L. Specifically, the position obtaining unit 103 obtains the magnitude of the magnetic flux density (the position of the rotor 41) based on the magnetic-flux-density signal Sm output by the magnetic sensor 95 each time the rotation control unit 101 inputs the pulse P to the stepping motor 66.

The position determining unit 104 determines whether the rotor 41 is positioned at the reference position Rx. Specifically, the position determining unit 104 compares the change in the rotation angle of the rotor 41 obtained by the rotation-angle obtaining unit 102 with the change pattern information J. Additionally, the position determining unit 104 compares the magnitude of the magnetic flux density obtained by the position obtaining unit 103 with the magnetic-flux-density threshold K. The position determining unit 104 determines that the rotor 41 is positioned at the reference position Rx when the change in the rotation angle of the rotor 41 matches the change pattern information J and the magnitude of the magnetic flux density is smaller than or equal to the magnetic-flux-density threshold K.

Next, the example of the initialization operation performed by the electric valve control device 90 is described with reference to FIG. 20. The electric valve control device 90 performs the initialization operation to position the rotor 41 at the reference position Rx.

When the electric valve control device 90 (specifically, the computer 100) receives an initializing command from the air conditioner control device 210 (S110), the electric valve control device 90 starts inputting the pulse P to the stepping motor 66 (in ascending order) to rotate the rotor 41 in the first direction (S120). The electric valve control device 90 functions as the rotation control unit 101. Thus, the driving currents corresponding to the pulses P are supplied to the stator 60, rotating the rotor 41 in the first direction.

The electric valve control device 90 obtains the rotation angle of the rotor 41 based on the rotation angle signal Sa each time the pulse P is input (S130). The electric valve control device 90 functions as the rotation-angle obtaining unit 102.

The electric valve control device 90 obtains the magnitude of the magnetic flux density based on the magneticflux-density signal Sm each time the pulse P is input (S140). The electric valve control device 90 functions as the position obtaining unit 103.

When the number of the pulses P input to the stepping motor 66 in the initialization operation is greater than or equal to the initialization number X (Y in S150), the electric valve control device 90 stops inputting the pulse P to the stepping motor 66 (S160). Then, the electric valve control device 90 determines that it is uncertain whether the rotor 41 is positioned at the reference position Rx, and notifies the air conditioner control device 210 that the initialization operation ends abnormally (S170).

When the number of the pulses P input to the stepping motor 66 in the initialization operation is smaller than the initialization number X (N in S150), the electric valve control device 90 determines whether the change in the rotation angle of the rotor 41 matches the change pattern information J (S180). The electric valve control device 90 functions as the position determining unit 104. Specifically, the electric valve control device 90 obtains changes in the rotation angle of the rotor 41 corresponding to the last eight pulses P input to the stepping motor 66. The electric valve control device 90 determines whether the combination of the last eight pulses P and the changes in the rotation angle corresponding to the respective eight pulses P matches the combination of the pulses P and the change information in the change pattern information J.

When the changes in the rotation angle of the rotor 41 do not match the change pattern information J (N in S180), the electric valve control device 90 returns to Step S130.

When the changes in the rotation angle of the rotor 41 match the change pattern information J (Y in S180), the electric valve control device 90 determines whether or not the position of the rotor 41 is at the proximity position Rk or a position nearer the reference position Rx than is the proximity position Rk (S190). The electric valve control device 90 functions as the position determining unit 104. Specifically, the electric valve control device 90 determines whether the magnitude of the magnetic flux density obtained in response to the latest input pulse P is smaller than or equal to the magnetic-flux-density threshold K.

When the magnitude of the magnetic flux density is greater than the magnetic-flux-density threshold K (N in S190), the electric valve control device 90 determines that the rotor 41 is positioned at neither the proximity position Rk nor a position nearer the reference position Rx than is the proximity position Rk and returns to Step S130. When the magnitude of the magnetic flux density is greater than the magnetic-flux-density threshold K (N in S190), the electric valve control device 90 may stop inputting the pulse P to the stepping motor 66 (S160), determine that the rotation of the rotor 41 in the first direction is restricted at a position other than the reference position Rx, and notify the air conditioner control device 210 that the initialization operation ends abnormally (S170).

When the magnitude of the magnetic flux density is smaller than or equal to the magnetic-flux-density threshold K (Y in S190), the electric valve control device 90 determines that the rotor 41 is positioned at the proximity position Rk or a position nearer the reference position Rx than is the proximity position Rk and stops inputting the pulse P to the stepping motor 66 (S210). Preferably, the electric valve control device 90 inputs the pulse P (pulse P[2], P[3], P[4], or P[5] in the change pattern information J in FIG. 18A) corresponding to the change information indicating no rotation in the change pattern information J as the last pulse P and stops inputting the pulse P. Then, the electric valve control device 90 determines that the rotor 41 is positioned at the reference position Rx and notifies the air conditioner control device 210 that the initialization operation ends normally (S220).

In the initialization operation described above, operations (S140 and S190) relating to the determination of the position of the rotor 41 can be omitted. However, including the operations relating to the determination of the position of the rotor 41 in the initialization operation can inhibit the electric valve control device 90 from making an incorrect determination that the rotor 41 is positioned at the reference position Rx when the rotation of the rotor 41 in the first direction is restricted at a position other than the reference position Rx due to, for example, foreign matter blockages or malfunctions.

Upon reception of notification indicating that the initialization operation for the electric valve 5 ends normally, the air conditioner control device 210 starts controlling the flow rate of refrigerant flowing through the pipe 205. Upon reception of notification indicating that the initialization operation for the electric valve 5 ends abnormally, the air conditioner control device 210 sends a change-pattern setting command to the electric valve control device 90 to reset the change pattern information J in the electric valve device 1.

Next, an example of the change-pattern setting operation performed by the electric valve control device 90 is described with reference to FIG. 21. The electric valve control device 90 performs the change-pattern setting operation to set the change pattern information J and the magnetic-flux-density threshold K.

When the electric valve control device 90 receives the change-pattern setting command from the air conditioner control device 210 (S310), the electric valve control device 90 starts inputting the pulse P to the stepping motor 66 (in ascending order) to rotate the rotor 41 in the first direction (S320). Thus, the driving currents corresponding to the pulses P are supplied to the stator 60, rotating the rotor 41 in the first direction.

The electric valve control device 90 obtains the rotation angle of the rotor 41 based on the rotation angle signal Sa of the magnetic sensor 95 each time the pulse P is input (S330).

The electric valve control device 90 obtains the magnitude of the magnetic flux density based on the magnetic-flux-density signal Sm of the magnetic sensor 95 each time the pulse P is input (S340).

When the number of the pulses P input to the stepping motor 66 in the change-pattern setting operation is greater than or equal to the initialization number X (Y in S350), the electric valve control device 90 stops inputting the pulse P to the stepping motor 66 (S360). Then, the electric valve control device 90 determines that the change pattern information J and the magnetic-flux-density threshold K are unable to be correctly set, and notifies the air conditioner control device 210 that the change-pattern setting operation ends abnormally (S370).

When the number of the pulses P input to the stepping motor 66 in the change-pattern setting operation is smaller than the initialization number X (N in S350), the electric valve control device 90 determines whether the change in the rotation angle of the rotor 41 indicating the rotation in the second direction occurs (S380). The change in the rotation angle of the rotor 41 indicating the rotation in the second direction is, for example, the change in the rotation angle represented in the period from N2 to N3 in FIG. 17.

When the change in the rotation angle of the rotor 41 indicating the rotation in the second direction does not occur (N in S380), the electric valve control device 90 returns to Step S330.

When the change in the rotation angle of the rotor 41 indicating the rotation in the second direction occurs (Y in S380), the electric valve control device 90 determines whether the rotation angles of the rotor 41 corresponding to the pulses P for one cycle are obtained (S390). The rotation angles of the rotor 41 corresponding to the pulses P for one cycle are, for example, rotation angles represented in the period from N3 to N5 in FIG. 17. Specifically, the electric valve control device 90 determines whether eight pulses P (including pulses P[1] to P[8]) are input to the stepping motor 66 after the change in the rotation angle of the rotor 41 indicating the rotation in the second direction occurs and the rotation angles of the rotor 41 corresponding to the respective pulses P are obtained.

When the rotation angles of the rotor 41 corresponding to the pulses P for one cycle are not obtained (N in S390), the electric valve control device 90 returns to Step S330.

When the rotation angles of the rotor 41 corresponding to the pulses P for one cycle are obtained (Y in S390), the electric valve control device 90 generates the change pattern information J based on the rotation angles and stores the change pattern information J in the non-volatile memory 92. The electric valve control device 90 calculates the magnitude of the magnetics flux density when the rotor 41 is at the proximity position Rk based on the magnitude of the magnetic flux density obtained in response to the latest input pulse P and stores the magnitude of the magnetic flux density in the non-volatile memory 92 as the magnetic-flux-density threshold K (S400).

The electric valve control device 90 stops inputting the pulse P to the stepping motor 66 (S410). Then, the electric valve control device 90 determines that the change pattern information J and the magnetic-flux-density threshold K are correctly set and notifies the air conditioner control device 210 that the change-pattern setting operation ends normally (S420).

Upon reception of notification indicating that the change-pattern setting operation for the electric valve 5 ends normally, the air conditioner control device 210 transmits the initializing command to the electric valve control device 90. Upon reception of notification indicating that the change-pattern setting operation for the electric valve 5 ends abnormally, the air conditioner control device 210 performs an operation for an anomaly, such as an operation to stop the air conditioning system 200, an operation to bring the air conditioning system 200 into a degeneration state, or the like.

When the change pattern information J is not stored in the non-volatile memory 92, for example, on shipment from the factory, the electric valve control device 90 performs the change-pattern setting operation to set the change pattern information J.

As described above, the electric valve device 1 according to the embodiment includes the electric valve 5 and the electric valve control device 90 for controlling the electric valve 5. The electric valve 5 includes the valve body 10 that has the valve port 17, the stepping motor 66 that includes the rotor 41, the valve member 30 that moves toward the valve port 17 when the rotor 41 rotates in the first direction and moves away from the valve port 17 when the rotor 41 rotates in the second direction, and the stopper mechanism ST that restricts rotation of the rotor 41 in the first direction when the rotor 41 is at the reference position Rx. The electric valve control device 90 includes the magnetic sensor 95 that outputs the signal (the rotation angle signal Sa) corresponding to the rotation angle of the rotor 41 and the signal (the magnetic-flux-density signal Sm) corresponding to the position of the rotor 41.

In the initialization operation for positioning the rotor 41 at the reference position Rx,
- (i) the electric valve control device 90 is configured to start inputting the pulse P to the stepping motor 66 to rotate the rotor 41 in the first direction,
- (ii) the electric valve control device 90 is configured to obtain the rotation angle of the rotor 41 based on the rotation angle signal Sa of the magnetic sensor 95 and the position of the rotor 41 based on the magnetic-flux-density signal Sm of the magnetic sensor 95 each time the pulse P is input to the stepping motor 66, and
- (iii) the electric valve control device 90 is configured to stop inputting the pulse P to the stepping motor 66 when the change in the rotation angle of the rotor 41 matches the change pattern information J and the position of the rotor 41 is the proximity position Rk or a position nearer the reference position Rx than is the proximity position Rk.

The change pattern information J includes the change in the rotation angle indicating the rotation in the second direction.

When the pulse P is input to the stepping motor 66, the driving current corresponding to the pulse P is supplied to the stator 60, rotating the rotor 41. Pulses P[1] to P[8] (i.e., the driving currents) are repeatedly input to the stepping motor 66 in the predetermined order. When the rotor 41 rotates in the first direction and reaches the reference position Rx, the electric valve 5 is brought into the state where the rotation of the rotor 41 in the first direction is restricted. When pulses P[1] to P[8] are further input to the stepping motor 66 in the state, the rotor 41 rotates in the second direction in response to a specific pulse P of pulses P[1] to P[8] being input and then in the first direction in response to another specific pulse P of pulses P[1] to P[8] being input. After that, the rotor 41 reaches the reference position Rx again. Consequently, stopping the pulse P input to the stepping motor 66 in response to detection of the change in the rotation angle of the rotor 41 indicating the rotation in the second direction enables the initialization operation to be finished quickly after the rotor 41 reaches the reference position Rx. Therefore, it is possible to reduce a duration of the initialization operation for the electric valve 5 and suppress noise.

The change pattern information J further includes the change in the rotation angle indicating the rotation in the first direction. The change pattern information J includes the changes in the rotation angle corresponding to pulses P[1] to P[8] repeatedly input to the stepping motor 66 in the predetermined order. With this configuration, positioning the rotor 41 at the reference position Rx can be determined more reliably.

The electric valve control device 90 is configured to obtain, in the change-pattern setting operation, the rotation angles corresponding to pulses P[1] to P[8] and set the change pattern information J based on the rotation angles when the change in the rotation angle of the rotor 41 indicating the rotation in the second direction is detected while the pulse P is input to the stepping motor 66 to rotate the rotor 41 in the first direction. With this configuration, the change pattern information J can be reset to be suitable for the electric valve 5 even though changes in the electric valve 5 occur over time.

In the embodiment described above, the electric valve control device 90 is configured to stop inputting the pulse P to the stepping motor 66 when the change in the rotation angle of the rotor 41 matches the change pattern information J that is predetermined and the position of the rotor 41 is the proximity position Rk that is predetermined or a position nearer the reference position Rx than is the proximity position Rk (the magnitude of the magnetic flux density is smaller than or equal to the magnetic-flux-density threshold K). The present invention, however, is not limited to the configuration.

For example, the electric valve control device 90 may be configured to stop inputting the pulse P to the stepping motor 66 by determining solely whether the change in the rotation angle of the rotor 41 matches the change pattern information J without determining the position of the rotor 41 (the magnitude of the magnetic flux density).

Alternatively, the electric valve control device 90 may be configured to determine that a change in the rotation angle signal Sa matches a change pattern that is predetermined.

Alternatively, in the initialization operation,
(i) the electric valve control device 90 may be configured to start inputting the pulse P to the stepping motor 66 to rotate the rotor 41 in the first direction,
(ii) the electric valve control device 90 may be configured to obtain the rotation angle of the rotor 41 based on the rotation angle signal Sa of the magnetic sensor 95 each time the pulse P is input to the stepping motor 66, and
(iii-1) the electric valve control device 90 may be configured to stop inputting the pulse P to the stepping motor 66 when the change in the rotation angle indicating the rotation in the second direction is detected, or
(iii-2) the electric valve control device 90 may be configured to stop inputting the pulse P to the stepping motor 66 when the change in the rotation angle indicating the rotation in the first direction is detected after the change in the rotation angle indicating the rotation in the second direction is detected.

Alternatively, in the initialization operation,
(i) the electric valve control device 90 may be configured to start inputting the pulse P to the stepping motor 66 to rotate the rotor 41 in the first direction,
(ii) the electric valve control device 90 may be configured to obtain the rotation angle of the rotor 41 based on the rotation angle signal Sa of the magnetic sensor 95 and the position of the rotor 41 based on the magnetic-flux-density signal Sm of the magnetic sensor 95 each time the pulse P is input to the stepping motor 66, and
(iii-1) the electric valve control device 90 may be configured to stop inputting the pulse P to the stepping motor 66 when the change in the rotation angle indicating the rotation in the second direction is detected and the position of the rotor 41 is the proximity position Rk or a position nearer the reference position Rx than is the proximity position Rk, or
(iii-2) the electric valve control device 90 may be configured to stop inputting the pulse P to the stepping motor 66 when the change in the rotation angle indicating the rotation in the first direction is detected after the change in the rotation angle indicating the rotation in the second direction is detected and the position of the rotor 41 is the proximity position Rk or the position nearer the reference position Rx than is the proximity position Rk.

With these configurations, determining whether the rotor 41 is positioned at the reference position Rx can be simplified.

In the embodiment described above, the magnetic sensor 95 detects the magnetic field generated by the permanent magnet 48. The present invention, however, is not limited to the configuration. For example, in the electric valve device 1, the permanent magnet 48 may be omitted, and the magnetic sensor 95 may be configured to detect a magnetic field generated by the magnetic poles of the rotor 41.

In the embodiment described above, the electric valve control device 90 sets the change pattern information J upon reception of the change-pattern setting command. The present invention, however, is not limited to the configuration. The electric valve control device 90 may be configured to reset the change pattern information J when the electric valve control device 90 determines that it is uncertain whether the rotor 41 is positioned at the reference position Rx in the initialization operation (S170 in FIG. 20). Specifically, the electric valve control device 90 holds the rotation angles of the rotor 41 corresponding to pulses P for one cycle from the change in the rotation angle indicating the rotation in the second direction in the rotation angles of the rotor 41 obtained in the initialization operation. Then, the electric valve control device 90 resets the change pattern information J based on the rotation angles that are held when the electric valve control device 90 determines that it is uncertain whether the rotor 41 is positioned at the reference position Rx.

In this specification, the terms indicating shapes of members, such as "circular cylindrical" and "circular columnar", are also used for members substantially having the shapes indicated by the terms. For example, "circular cylindrical member" includes a circular cylindrical member and a substantially circular cylindrical member.

The embodiment of the present invention is described above. The present invention, however, is not limited to the embodiment. Embodiments obtained by a person skilled in the art appropriately adding, removing, or modifying components according to the embodiment described above, and an embodiment obtained by appropriately combining features of the embodiment are included in the scope of the present invention without departing from the spirit of the present invention.

REFERENCE SIGNS LIST

1 . . . electric valve device, 5 . . . electric valve, 7 . . . valve body assembly, 10 . . . valve body, 11 . . . body member, 12 . . . cylindrical member, 12a . . . fitting hole, 13 . . . connection member, 14 . . . valve chamber, 15 . . . flow channel, 16 . . . ,flow channel, 17 . . . valve port, 18 . . . valve seat, 20 . . . can, 30 . . . valve member, 31 . . . first stem portion, 32 . . . second stem portion, 33 . . . valve portion, 34 . . . step portion, 35 . . . push nut, 40 . . . driving mechanism, 41 . . . rotor, 42 . . . valve stem holder, 42a . . . upper wall portion, 42b . . . stem hole, 42c . . . internal thread, 42s . . . movable stopper, 43 . . . guide bush, 43a . . . base portion, 43b . . . supporting portion, 43c . . . external thread, 44 . . . stopper member, 44s . . . fixed stopper, 45 . . . supporting ring, 46 . . . washer, 47 . . . valve closing spring, 48 . . . permanent magnet, 49 . . . fixed member, 50 . . . stator unit, 60 . . . stator, 61. . . . A-phase stator, 61a . . . pole tooth, 61b. . . pole tooth, 61c . . . coil, 62. . . . B-phase stator, 62a . . . pole tooth, 62b . . . pole tooth, 62c . . . coil, 66 . . . stepping motor, 70 . . . housing, 74 . . . inner space, 80 . . . case, ST . . . stopper mechanism, 90 ... electric valve control device, 91A ... main circuit board, 91B ... sub circuit board, 92 ... non-volatile memory, 93 ... communication device, 94 ... motor driver, 95 ... magnetic sensor, 100 ... computer, 101 ... rotation control unit, 102 ... rotation-angle obtaining unit, 103 ... position obtaining unit, 104 ... position determining unit, 200 ... air conditioning system, 201 ... compressor, 202 ... condenser, 203 ... evaporator, 205 ... pipe, 210 ... air conditioner control device, 220 ... wired communication bus, P ... pulse, L ... axis, X ... initialization number, J ... change pattern information, K ... magnetic-flux-density threshold, Rx ... reference position, Rk ... proximity position, Rc ... valve closing position, Rz ... full-open position, Sa ... rotation angle signal, Sm ... magnetic-flux-density signal

The invention claimed is:

1. An electric valve control device for controlling an electric valve including a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position,
the electric valve control device comprising:
a rotation angle sensor that outputs a signal corresponding to a rotation angle of the rotor; and
a position sensor that outputs a signal corresponding to a position of the rotor,
wherein
(i) the electric valve control device is configured to start inputting a pulse to the stepping motor to rotate the rotor in the first direction,
(ii) the electric valve control device is configured to obtain the rotation angle of the rotor based on the signal of the rotation angle sensor and the position of the rotor based on the signal of the position sensor each time the pulse is input to the stepping motor, and
(iii) the electric valve control device is configured to stop inputting the pulse to the stepping motor when a change in the rotation angle matches a change pattern that is predetermined and the position of the rotor is a proximity position that is predetermined or a position nearer the reference position than is the proximity position, and
wherein the change pattern includes a change in the rotation angle indicating rotation in the second direction.

2. The electric valve control device according to claim 1, wherein the change pattern further includes a change in the rotation angle indicating the rotation in the first direction.

3. The electric valve control device according to claim 1, wherein the change pattern includes changes in the rotation angle corresponding to multiple pulses repeatedly input to the stepping motor in a predetermined order.

4. The electric valve control device according to claim 3, wherein the electric valve control device is configured to obtain, in an operation to set the change pattern, rotation angles corresponding to the multiple pulses and set the change pattern based on the rotation angles when the change in the rotation angle indicating the rotation in the second direction is detected while the pulse is input to the stepping motor to rotate the rotor in the first direction.

5. The electric valve control device according to claim 1, wherein the electric valve includes a permanent magnet mounted on the rotor, and
wherein the rotation angle sensor outputs a signal corresponding to a rotation angle of a magnetic field generated by the permanent magnet.

6. The electric valve control device according to claim 1, wherein the electric valve includes a permanent magnet mounted on the rotor,
wherein the rotor moves toward the valve port when the rotor rotates in the first direction and moves away from the valve port when the rotor rotates in the second direction,
wherein the rotation angle sensor outputs a signal corresponding to a rotation angle of a magnetic field generated by the permanent magnet, and
wherein the position sensor outputs a signal corresponding to a strength of the magnetic field generated by the permanent magnet.

7. An electric valve device comprising:
the electric valve; and
the electric valve control device according to claim 1.

8. An electric valve control device for controlling an electric valve including a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position,
the electric valve control device comprising:
a rotation angle sensor that outputs a signal corresponding to a rotation angle of the rotor; and
a position sensor that outputs a signal corresponding to a position of the rotor,
wherein
(i) the electric valve control device is configured to start inputting a pulse to the stepping motor to rotate the rotor in the first direction,
(ii) the electric valve control device is configured to obtain the rotation angle of the rotor based on the signal of the rotation angle sensor and the position of the rotor based on the signal of the position sensor each time the pulse is input to the stepping motor, and
(iii-1) the electric valve control device is configured to stop inputting the pulse to the stepping motor when a change in the rotation angle indicating rotation in the second direction is detected and the position of the rotor is a proximity position that is predetermined or a position nearer the reference position than is the proximity position, or (iii-2) the electric valve control device is configured to stop inputting the pulse to the stepping motor when a change in the rotation angle indicating the rotation in the first direction is detected after the change in the rotation angle indicating the rotation in the second direction is detected and the position of the rotor is the proximity position or the position nearer the reference position than is the proximity position.

9. An electric valve control device for controlling an electric valve including a valve body that has a valve port, a stepping motor that includes a rotor, a valve member that moves toward the valve port when the rotor rotates in a first direction and moves away from the valve port when the rotor rotates in a second direction, and a stopper mechanism that restricts rotation of the rotor in the first direction when the rotor is at a reference position, the electric valve control device comprising:
a rotation angle sensor that outputs a signal corresponding to a rotation angle of the rotor, the signal being a rotation angle signal; and
a position sensor that outputs a signal corresponding to a position of the rotor, the signal being a position signal,
wherein
(i) the electric valve control device is configured to start inputting a pulse to the stepping motor to rotate the rotor in the first direction,
(ii) the electric valve control device is configured to obtain the rotation angle signal and the position signal, and
(iii-1) the electric valve control device is configured to stop inputting the pulse to the stepping motor when a change in the rotation angle signal indicating rotation in the second direction is detected and the position signal has a value corresponding to a proximity position that is predetermined or a position nearer the reference position than is the proximity position, or (iii-2) the electric valve control device is configured to stop inputting the pulse to the stepping motor when a change in the rotation angle signal indicating the rotation in the first direction is detected after the change in the rotation angle signal indicating the rotation in the second direction is detected and the position signal has the value corresponding to the proximity position or the position nearer the reference position than is the proximity position.

* * * * *